US010309483B2

(12) United States Patent
Takikawa et al.

(10) Patent No.: US 10,309,483 B2
(45) Date of Patent: Jun. 4, 2019

(54) DAMPER DEVICE

(71) Applicant: AISIN AW CO., LTD., Anjo-shi, Aichi-ken (JP)

(72) Inventors: Yoshihiro Takikawa, Tsushima (JP); Hiroki Nagai, Anjo (JP); Masaki Wajima, Anjo (JP); Takao Sakamoto, Anjo (JP); Kazuhiro Itou, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 31 days.

(21) Appl. No.: 15/501,663

(22) PCT Filed: Sep. 14, 2015

(86) PCT No.: PCT/JP2015/076065
§ 371 (c)(1),
(2) Date: Feb. 3, 2017

(87) PCT Pub. No.: WO2016/039483
PCT Pub. Date: Mar. 17, 2016

(65) Prior Publication Data
US 2017/0227088 A1    Aug. 10, 2017

(30) Foreign Application Priority Data

Sep. 12, 2014 (JP) .................. 2014-186845
Mar. 31, 2015 (JP) .................. 2015-071610
(Continued)

(51) Int. Cl.
F16F 15/134    (2006.01)
F16H 45/02     (2006.01)
F16D 13/64     (2006.01)
F16F 15/123    (2006.01)
F16D 13/40     (2006.01)

(52) U.S. Cl.
CPC ........ *F16F 15/13492* (2013.01); *F16D 13/64* (2013.01); *F16F 15/1236* (2013.01);
(Continued)

(58) Field of Classification Search
None
See application file for complete search history.

(56) References Cited

U.S. PATENT DOCUMENTS

2010/0096788 A1    4/2010  Farahati et al.
2017/0227088 A1    8/2017  Takikawa et al.
(Continued)

FOREIGN PATENT DOCUMENTS

DE    10 2009 013 965 A1    9/2010
JP         2010-230155 A    10/2010
(Continued)

OTHER PUBLICATIONS

Oct. 27, 2015 International Search Report issued in Patent Application No. PCT/JP2015/076065.
(Continued)

*Primary Examiner* — Timothy Hannon
(74) *Attorney, Agent, or Firm* — Oliff PLC

(57) ABSTRACT

A damper device with a first intermediate element; a second intermediate element; a first elastic body that transmits torque between the input element and the first intermediate element; a second elastic body that transmits torque between the first intermediate element and the output element; a third elastic body that transmits torque between the input element and the second intermediate element; a fourth elastic body that transmits torque between the second intermediate element and the output element; and a fifth elastic body that transmits torque between the first intermediate element and the second intermediate element.

30 Claims, 13 Drawing Sheets

(30) Foreign Application Priority Data

| Mar. 31, 2015 | (JP) | 2015-071793 |
| Jun. 8, 2015 | (JP) | 2015-115845 |
| Jul. 27, 2015 | (JP) | 2015-147598 |

(52) U.S. Cl.
CPC ....... *F16F 15/13476* (2013.01); *F16H 45/02* (2013.01); *F16D 13/40* (2013.01); *F16D 2300/22* (2013.01); *F16F 2228/007* (2013.01); *F16F 2228/066* (2013.01); *F16H 2045/0221* (2013.01); *F16H 2045/0294* (2013.01)

(56) References Cited

U.S. PATENT DOCUMENTS

2018/0073594 A1* 3/2018 Takikawa .............. F16F 15/134
2018/0080524 A1* 3/2018 Takikawa ............ F16F 15/1236

FOREIGN PATENT DOCUMENTS

| JP | 2012-506006 A | 3/2012 |
| WO | 2013/161493 A1 | 10/2013 |

OTHER PUBLICATIONS

Nov. 26, 2018 Office Action issued in U.S. Appl. No. 15/553,387.
Nov. 26, 2018 Office Action issued in U.S. Appl. No. 15/562,761.
May 17, 2016 International Search Report issued in International Patent Application No. PCT/JP2016/060849.
Aug. 9, 2016 International Search Report issued in International Patent Application No. PCT/JP2016/067038.
U.S. Appl. No. 15/562,761, filed Sep. 28, 2017 in the name of Takikawa et al.
U.S. Appl. No. 15/553,387, filed Aug. 24, 2017 in the name of Takikawa et al.

* cited by examiner

DAMPER DEVICE

BACKGROUND

The disclosure of the present disclosure relates to a damper device having an input element to which torque from an engine is transmitted and an output element.

Conventionally, as a damper device of this type, a double path damper used in conjunction with a torque converter has been known (see Published Japanese Translation of PCT Application No. 2012-506006, for example). In this damper device, a vibration path from an engine and a lockup clutch to an output hub is divided into two parallel vibration paths B and C, and these two vibration paths B and C each have a pair of springs and an intermediate flange disposed between the pair of springs. The turbine of the torque converter is coupled to the intermediate flange of the vibration path B so as to make natural frequencies of the two vibration paths different, and the natural frequency of the intermediate flange of the vibration path B is lower than the natural frequency of the intermediate flange of the vibration path C. In this damper device, when the lockup clutch is engaged, vibrations from the engine enter the two vibration paths B and C of the damper device. When engine vibrations having a certain frequency reach the vibration path B including the intermediate flange coupled to the turbine, the phase of vibrations from the intermediate flange of the vibration path B to the output hub shifts 180° with respect to the phase of input vibrations. At this time, because the natural frequency of the intermediate flange of the vibration path C is higher than the natural frequency of the intermediate flange of the vibration path B, vibrations entering the vibration path C are transmitted to the output hub without a phase shift (without being out of phase). In this manner, by producing a 180° shift between the phase of vibrations transmitted from the vibration path B to the output hub and the phase of vibrations transmitted from the vibration path C to the output hub, vibrations in the output hub can be damped.

SUMMARY

In order to improve the vibration damping performance of the double path damper described in Published Japanese Translation of PCT Application No. 2012-506006, it is necessary to adjust the spring constants of elastic bodies on both sides of each intermediate flange and the weight of each of the intermediate flanges to suitably set the natural frequencies of the vibration paths B and C. However, adjusting the spring constants of the elastic bodies to optimize the natural frequencies of the vibration paths B and C may cause significant variations in the stiffness of the entire double path damper. Furthermore, adjusting the weights of the intermediate flanges and the turbine joined thereto to optimize two natural frequencies may increase the weights of the flanges and the turbine, and consequently increase the weight of the entire torque converter. Thus, in the double path damper, it is not easy to suitably set the natural frequencies of the vibration paths B and C so as to improve vibration damping performance. Depending on the frequency of vibrations to be damped, there are cases where the vibration cannot be satisfactorily damped even by the damper device described in Published Japanese Translation of PCT Application No. 2012-506006.

An exemplary aspect of the present disclosure provides a damper device having a higher vibration damping performance.

The damper device of the present disclosure is a damper device having an input element to which torque from an engine is transmitted and an output element. The damper device includes: a first intermediate element; a second intermediate element; a first elastic body that transmits torque between the input element and the first intermediate element; a second elastic body that transmits torque between the first intermediate element and the output element; a third elastic body that transmits torque between the input element and the second intermediate element; a fourth elastic body that transmits torque between the second intermediate element and the output element; and a fifth elastic body that transmits torque between the first intermediate element and the second intermediate element.

In this damper device, under conditions in which all the first to fifth elastic bodies are allowed to deform, two natural frequencies can be set in the entire device. Researches and analyses conducted by the inventors have revealed that the natural frequency of the damper device including the first to fifth elastic bodies decreases as the stiffness of the fifth elastic body decreases, and that a change in equivalent stiffness of the damper device with respect to a change in stiffness of the fifth elastic body is significantly smaller than changes in the equivalent stiffness with respect to changes in stiffnesses of the first to fourth elastic bodies. Thus, in this damper device, by adjusting the stiffness of the fifth elastic body, it is possible to suitably set two natural frequencies of the entire device while suitably maintaining the equivalent stiffness of the damper device and preventing the weights (moments of inertia) of the first and second intermediate elements from increasing. Consequently, in this damper device, the vibration damping performance can be satisfactorily improved.

DETAILED DESCRIPTION OF EMBODIMENTS

The following describes modes for carrying out the disclosure of the present disclosure with reference to the drawings.

Figure 1:
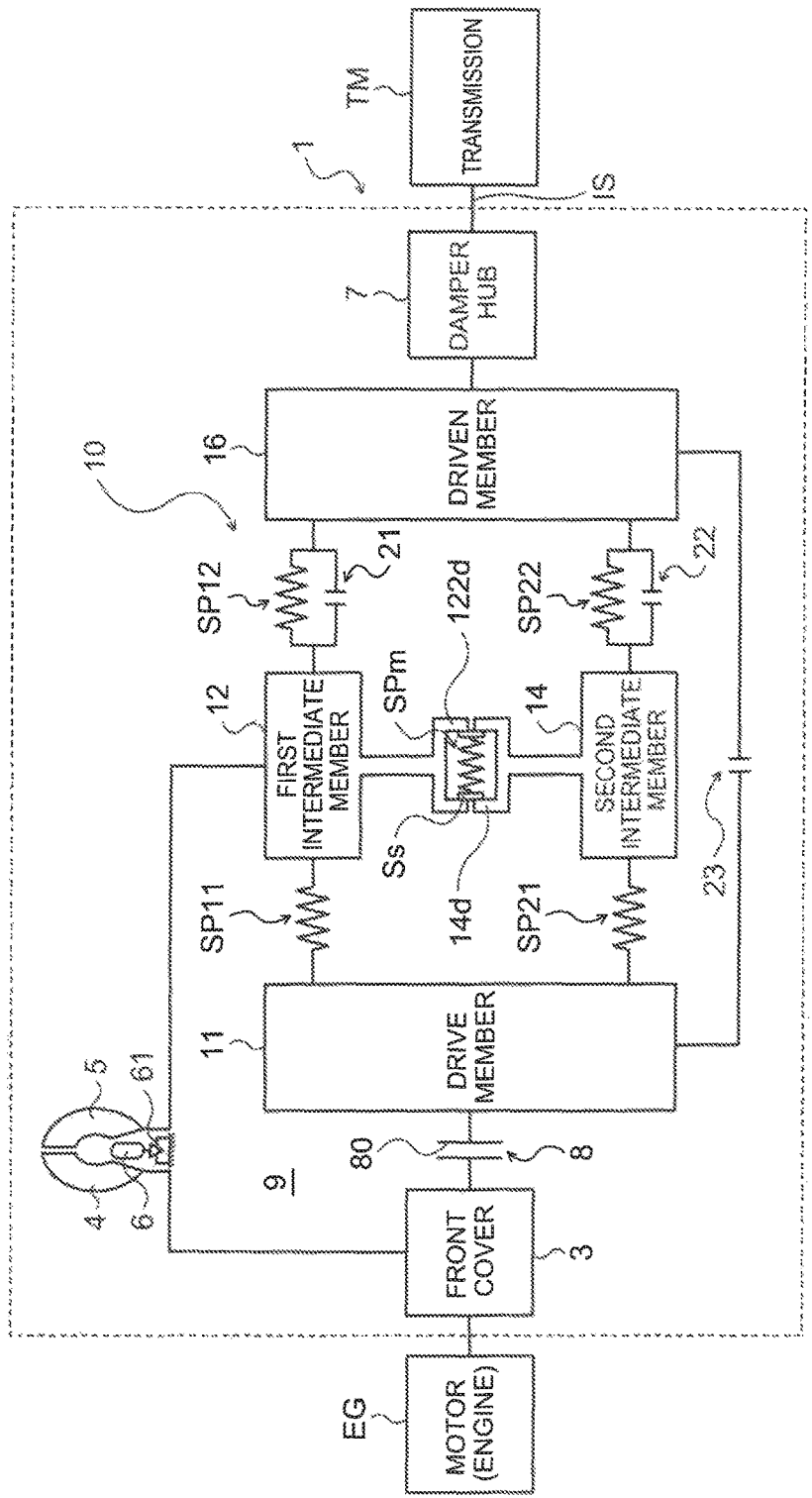
FIG. 1 is a schematic configuration diagram illustrating a starting device including a damper device of the present disclosure.
Figure 2:
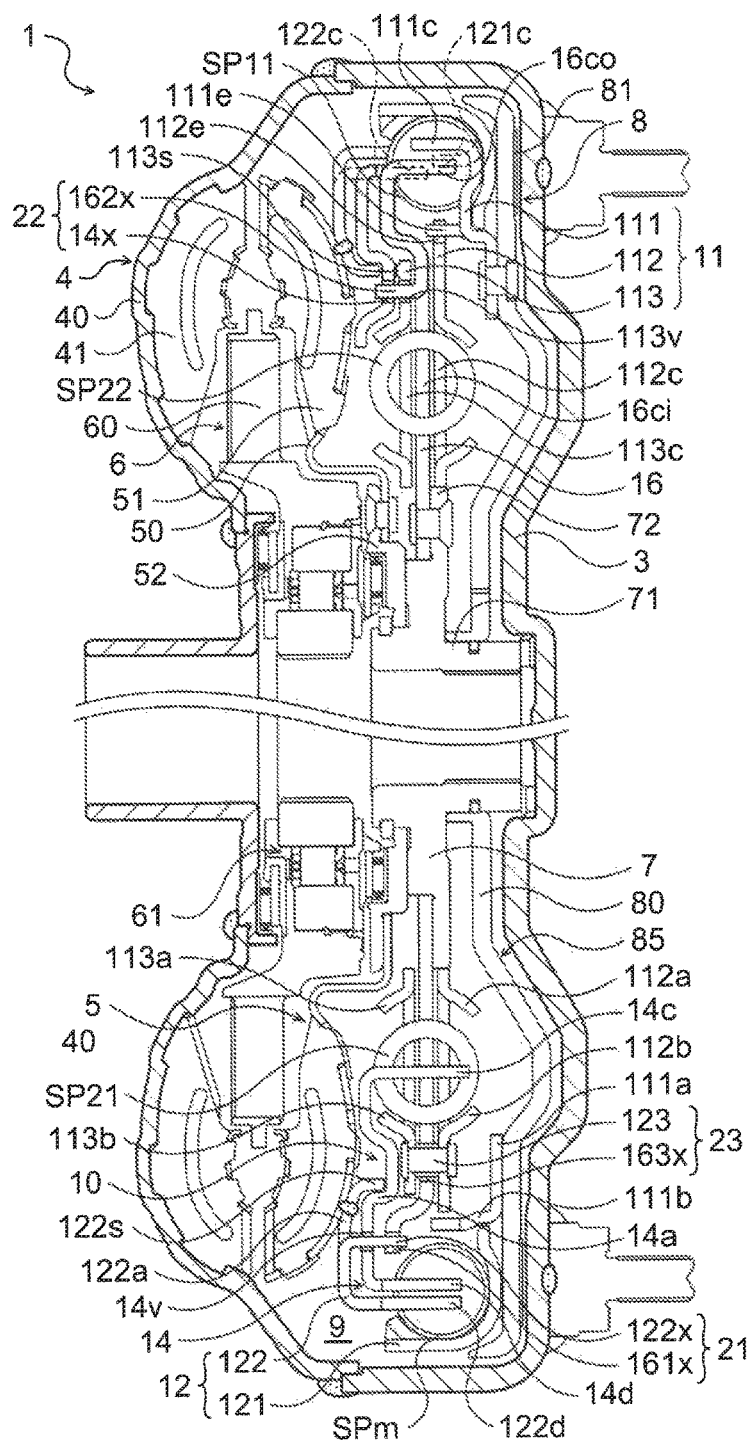
FIG. 2 is a sectional view illustrating the starting device in FIG. 1.

FIG. 1 is a schematic configuration diagram illustrating a starting device 1 including a damper device 10 of the present disclosure, and FIG. 2 is a sectional view illustrating the starting device 1. The starting device 1 depicted in these drawings is a device mounted on a vehicle including an engine (internal combustion engine in the present embodiment) EG as a motor. In addition to the damper device 10, the starting device 1 includes a front cover 3 coupled to a crankshaft of the engine EG, a pump impeller (input-side fluid transmitting element) 4 fixed to the front cover 3, a turbine runner (output-side fluid transmitting element) 5 that is rotatable coaxially with the pump impeller 4, a damper hub 7 as a power output member fixed to an input shaft IS of a transmission (power transmitting apparatus) TM that is coupled to the damper device 10 and is an automatic transmission (AT), continuously variable transmission (CVT), a dual clutch transmission (DCT), a hybrid transmission, or a speed reducer, and a lockup clutch 8.

In the following description, the term "axial direction" basically means, unless otherwise specified, an extending direction of a central axis (axis) of the starting device 1 or the damper device 10. The term "radial direction" basically means, unless otherwise specified, a radial direction of the starting device 1, the damper device 10, or a rotating element such as the damper device 10, that is, an extending direction of a straight line extending from a central axis of the starting device 1 or the damper device 10 in a direction orthogonal to the central axis (in a radial direction). Furthermore, the term "circumferential direction" basically means, unless otherwise specified, a circumferential direction of the starting device 1, the damper device 10, or a rotating element such as the damper device 10, that is, a direction along the rotation direction of the rotating element.

The pump impeller 4 has a pump shell 40 that is tightly fixed to the front cover 3 and a plurality of pump blades 41 arranged on the inner surface of the pump shell 40 as depicted in FIG. 2. The turbine runner 5 has a turbine shell 50 and a plurality of turbine blades 51 arranged on the inner surface of the turbine shell 50 as depicted in FIG. 2. The inner periphery of the turbine shell 50 is fixed to the turbine hub 52 via a plurality of rivets. The turbine hub 52 is rotatably supported by the damper hub 7, and movement of the turbine hub 52 (turbine runner 5) in the axial direction of the starting device 1 is restricted by the damper hub 7 and a snap ring mounted on the damper hub 7.

The pump impeller 4 and the turbine runner 5 face each other, and between these, a stator 6 configured to adjust a flow of hydraulic oil (hydraulic fluid) from the turbine runner 5 to the pump impeller 4 is disposed coaxially therewith. The stator 6 has a plurality of stator blades 60, and the rotation direction of the stator 6 is set in only one direction by a one-way clutch 61. The pump impeller 4, the turbine runner 5, and the stator 6 form a torus (annular flow path) through which the hydraulic oil is circulated, and function as a torque converter (fluid transmission apparatus) having a torque amplifying function. Note that, in the starting device 1, the pump impeller 4 and the turbine runner 5 may be configured to function as a fluid coupling by omitting the stator 6 and the one-way clutch 61.

The lockup clutch 8 performs lockup to couple the front cover 3 to the damper hub 7 via the damper device 10 and also releases the lockup. In the present embodiment, the lockup clutch 8 is structured as a single-plate hydraulic clutch, and has a lockup piston (power input member) 80 that is disposed inward of the front cover 3 and near the inner wall surface of the front cover 3 on the engine EG side and that is fitted to the damper hub 7 so as to be movable in the axial direction. On a surface of the lockup piston 80 which is on the outer peripheral side and on the front cover 3 side, a friction material 81 is stuck as depicted in FIG. 2. Furthermore, between the lockup piston 80 and the front cover 3, a lockup chamber (engagement oil chamber) 85 is defined that is connected to a hydraulic control apparatus (not depicted) via a hydraulic-oil supply path or a path formed in the input shaft IS.

Into the lockup chamber 85, hydraulic oil can flow that is supplied radially outward by the hydraulic control apparatus from the axis side (near the one-way clutch 61) of the pump impeller 4 and the turbine runner 5 to the pump impeller 4 and the turbine runner 5 (torus) via the oil path formed in the input shaft IS, for example. Thus, when the pressure in a fluid transmission chamber 9 defined by the front cover 3 and the pump shell of the pump impeller 4 and the pressure in the lockup chamber 85 are maintained equal, the lockup piston 80 does not move toward the front cover 3, so that the lockup piston 80 is not frictionally engaged with the front cover 3. In contrast, when the pressure in the lockup chamber 85 is reduced by the hydraulic control apparatus (not depicted), the lockup piston 80 is moved by the resulting pressure difference toward the front cover 3, and is frictionally engaged with the front cover 3. Accordingly, the front cover 3 (engine EG) is coupled to the damper hub 7 via the lockup piston 80 and the damper device 10. Herein, as the lockup clutch 8, a multi-plate hydraulic clutch including at least one friction engagement plate (a plurality of friction materials) may be used. In this case, the clutch drum or the clutch hub of the multi-plate hydraulic clutch functions as a power input member.

The damper device 10 is a device that damps vibration between the engine EG and the transmission TM, and includes, as shown in FIG. 1, a drive member (input element) 11, a first intermediate member (first intermediate element) 12, a second intermediate member (second intermediate element) 14, and a driven member (output element) 16 as rotating elements (rotating members, i.e., rotating mass bodies) that relatively rotate about the same axis. The damper device 10 further includes, as torque-transmitting elements (torque-transmitting elastic bodies), a plurality of (e.g., two in the present embodiment) first outer springs (first elastic body) SP11 disposed between the drive member 11 and the first intermediate member 12 to transmit rotational torque (torque in a rotation direction), a plurality of (e.g., two in the present embodiment) second outer springs (second elastic body) SP12 disposed between the first intermediate member 12 and the driven member 16 to transmit rotational torque (torque in a rotation direction), a plurality of (e.g., three in the present embodiment) first inner springs (third elastic body) SP21 disposed between the drive member 11 and the second intermediate member 14 to transmit rotational torque, a plurality of (e.g., three in the present embodiment) second inner springs (fourth elastic body) SP22 disposed between the second intermediate member 14 and the driven member 16 to transmit rotational torque, and a plurality of (e.g., two in the present embodiment) intermediate springs (fifth elastic body) SPm disposed between the first intermediate member 12 and the second intermediate member 14 to transmit rotational torque.

In the present embodiment, as the first and second outer springs SP11 and SP12, the first and second inner springs SP21 and SP22, and the intermediate springs SPm, straight coil springs are used, each made of a metal material that is spirally wound so as to have an axis extending straight when no load is applied. This type of coil springs allows the springs SP11 to SPm to extend and contract along the axes more suitably than in the case of using arcuate coil springs, thereby enabling reduction in hysteresis caused by friction force generated between the springs transmitting torque and rotating elements, that is, the difference between output torque when torque input to the drive member 11 increases and output torque when torque input to the drive member 11 decreases. The hysteresis can be quantified by subtraction between torque that is output from the driven member 16 when the torsional angle of the damper device 10 reaches a predetermined angle during an increase of torque input to the drive member 11 and torque that is output from the driven member 16 when the torsional angle of the damper device 10 reaches the predetermined angle during a decrease of torque input to the drive member 11. Herein, at least one of the springs SP11 to SPm may be an arcuate coil spring.

Figure 3:
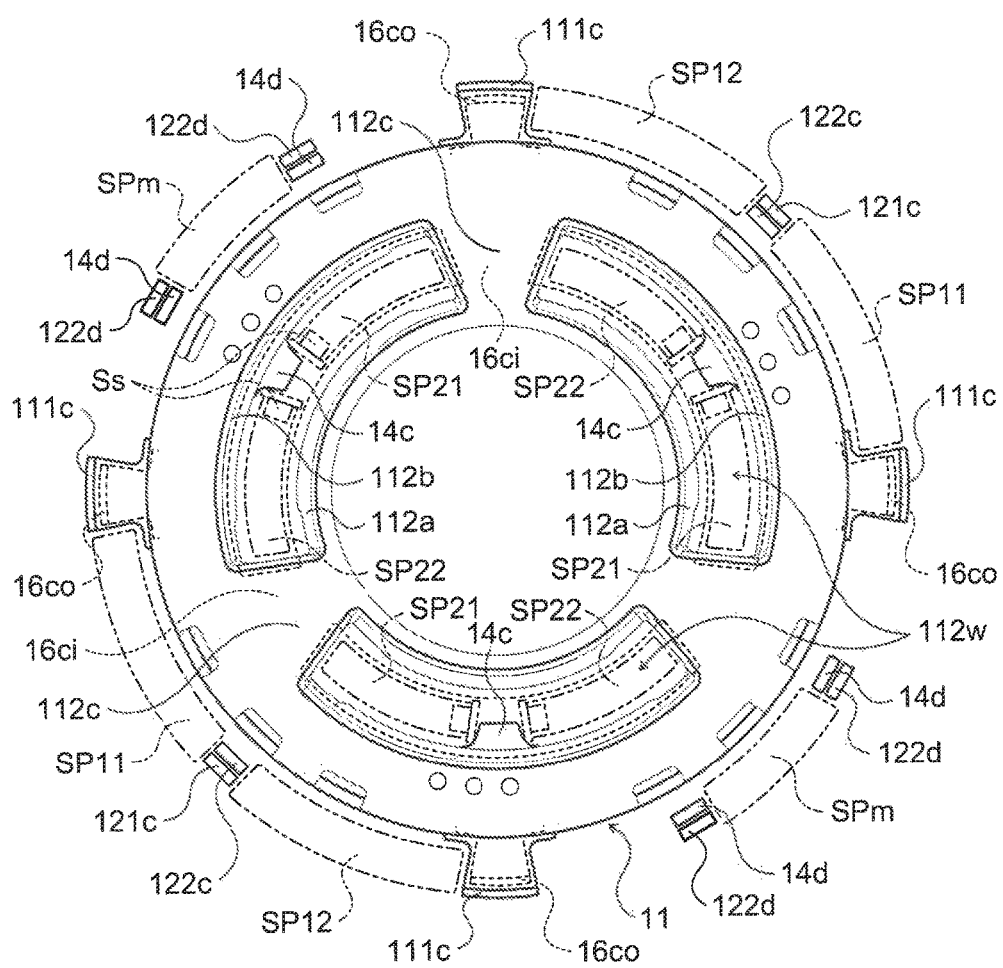
FIG. 3 is a front view illustrating components of the damper device of the present disclosure.

In the present embodiment, as depicted in FIG. 3, the first outer springs SP11, the second outer springs SP12, and the intermediate springs SPm are aligned in the order of SP11, SP12, SPm, SP11, SP12, and SPm, for example, along the circumferential direction of the damper device 10 (first intermediate member 12), and are arranged in an outer peripheral region in the fluid transmission chamber 9 so as to be positioned close to the outer periphery of the starting device 1. In this manner, the intermediate springs SPm are disposed so as to be aligned with the first and second outer springs SP11 and SP12 on the outer peripheral side along the circumferential direction, whereby strokes of the first and second outer springs SP11 and SP12 and the intermediate springs SPm can be suitably secured. Furthermore, as depicted in FIG. 3, each first inner spring SP21 is paired with a second inner spring SP22 (acts in series). The first and second inner springs SP21 and SP22 are arranged radially inward of the first and second outer springs SP11 and SP12 and the intermediate springs SPm so as to be alternately aligned along the circumferential direction of the damper device 10 (second intermediate member 14), and are surrounded by the springs SP11, SP12, and SPm.

In the present embodiment, when the stiffness, i.e., the spring constant, of the first outer springs SP11 is "$k_{11}$", the stiffness, i.e., the spring constant, of the second outer springs SP12 is "$k_{12}$", the stiffness, i.e., the spring constant, of the first inner springs SP21 is "$k_{21}$", and the stiffness, i.e., the spring constant, of the second inner springs SP22 is "$k_{22}$", the spring constants $k_{11}$, $k_{12}$, $k_{21}$, and $k_{22}$ are selected so as to satisfy $k_{11} \neq k_{21}$ and $k_{11}/k_{21} \neq k_{12}/k_{22}$. More specifically, the spring constants $k_{11}$, $k_{12}$, $k_{21}$, and $k_{22}$ satisfy the relations of $k_{11}/k_{21} < k_{12}/k_{22}$ and $k_{11} < k_{12} < k_{22} < k_{21}$. Furthermore, when the stiffness, i.e., the spring constant, of the intermediate springs SPm is "$k_m$", the spring constants $k_{11}$, $k_{12}$, $k_{21}$, $k_{22}$, and $k_m$ satisfy the relation of $k_{11} < k_m < k_{12} \ll k_{22} < k_{21}$.

As depicted in FIG. 2, the drive member 11 of the damper device 10 includes an annular first plate member (first input member) 111 that is fixed to the lockup piston 80 of the lockup clutch 8, an annular second plate member (second input member) 112 that is rotatably supported (aligned) by the damper hub 7 and is coupled to the first plate member 111 so as to rotate integrally therewith, and an annular third plate member (third input member) 113 that is disposed to be positioned closer to the turbine runner 5 than the second plate member 112 and is coupled (fixed) to the second plate member 112 by a plurality of rivets 123. Accordingly, the drive member 11, i.e., the first, second, and third plate members 111, 112, and 113, rotates integrally with the lockup piston 80, and engagement of the lockup clutch 8 couples the front cover 3 (engine EG) to the drive member 11 of the damper device 10.

Figure 4:
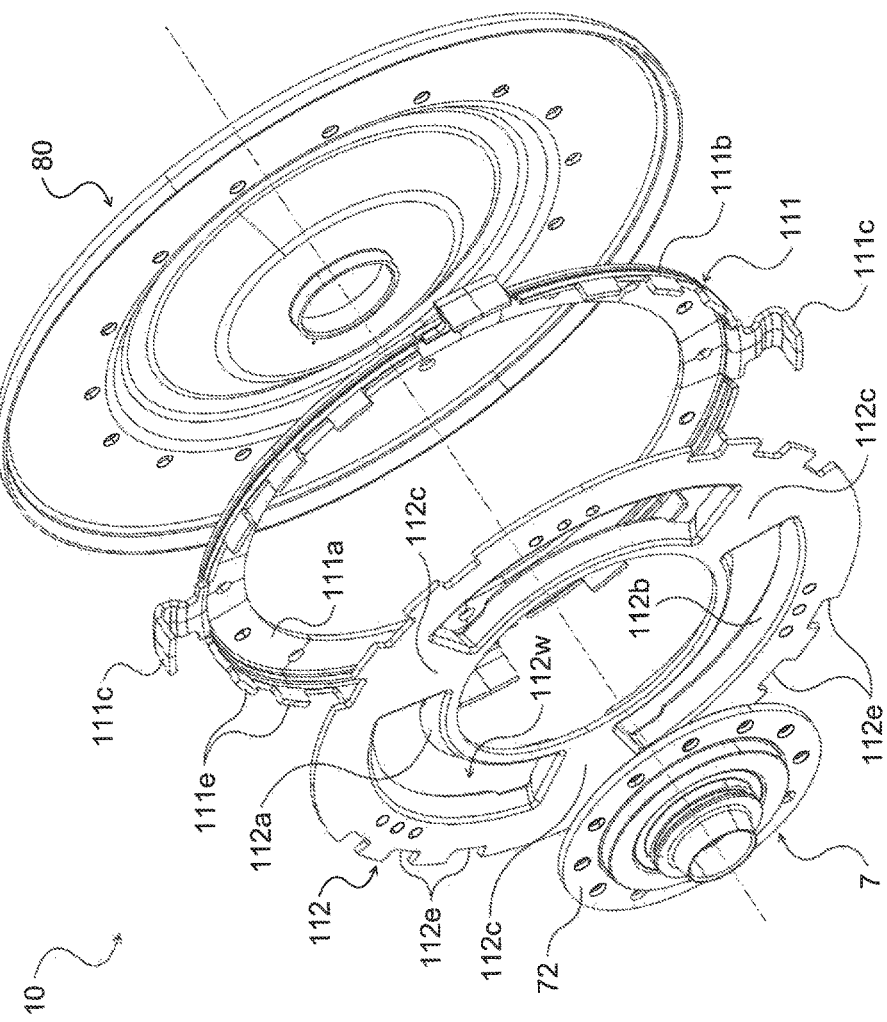
FIG. 4 is a perspective view illustrating components of the damper device of the present disclosure.

As depicted in FIGS. 2 and 4, the first plate member 111 has an annular fixed portion 111a that is fixed to an inner surface (surface to which the friction material 81 is not stuck) of the lockup piston 80 on the outer peripheral side via a plurality of rivets, a short cylindrical portion 111b that is extended from the outer periphery of the fixed portion 111a in the axial direction, a plurality of (e.g., four in the present embodiment) spring contact portions (first contact portions) 111c that are extended radially outward from a free end of the cylindrical portion 111b at intervals (evenly spaced) in the circumferential direction and extend in the axial direction so as to be spaced apart from the fixed portion 111a, and a plurality of (e.g., 12 in the present embodiment) engaging protrusions 111e that are extended from the free end of the cylindrical portion 111b in the axial direction at intervals in the circumferential direction. As depicted in FIG. 2, the lockup piston 80 to which the first plate member 111 is fixed is rotatably supported by a cylindrical first support portion 71 formed on the damper hub 7.

The second plate member 112, structured as a plate-like annular member, is disposed so as to be positioned closer to the lockup piston 80 than the third plate member 113, and is rotatably supported by a cylindrical second support portion 72 formed on the damper hub 7. As depicted in FIG. 2, the second support portion 72 of the damper hub 7 is formed by being shifted from the first support portion 71 in the axial direction of the damper device 10 so as to be positioned closer to the turbine runner 5 than the first support portion 71. The second support portion 72 has an outer diameter that is larger than that of the first support portion 71, and is provided radially outward of the first support portion 71.

The second plate member 112 has a plurality of (e.g., three in the present embodiment) spring-accommodating slots 112w (see FIGS. 3 and 4) that each extend in a circular arc shape and are aligned at intervals (evenly spaced) in the circumferential direction, a plurality of (e.g., three in the present embodiment) spring support portions 112a that each extend along the inner periphery of the corresponding spring-accommodating slot 112w and are aligned at intervals (evenly spaced) in the circumferential direction, a plurality of (e.g., three in the present embodiment) spring support portions 112b that each extend along the outer periphery of the corresponding spring-accommodating slot 112w and are aligned at intervals (evenly spaced) in the circumferential direction so as to face the corresponding spring support portion 112a in the radial direction of second plate member 112, and a plurality of (e.g., three in the present embodiment) spring contact portions (second contact portions) 112c. The spring contact portions 112c of the second plate member 112 are provided one by one between the spring-accommodating slots 112w (spring support portions 112a and 112b) that are adjacent each other along the circumferential direction. Furthermore, on the outer periphery of the second plate member 112, a plurality of (e.g., 12 in the present embodiment) engaging recesses 112e are formed at intervals in the circumferential direction. Into the engaging recesses 112e, the respective engaging protrusions 111e of the first plate member 111 are fitted with play in the radial direction. Fitting the engaging protrusions 111e into the engaging recesses 112e enables the first and second plate members 111 and 112 to relatively move in the radial direction.

The third plate member 113 is also structured as a plate-like annular member. The third plate member 113 has a plurality of (e.g., three in the present embodiment) spring-accommodating slots that each extend in a circular arc shape and are arranged at intervals (evenly spaced) in the circumferential direction, a plurality of (e.g., three in the present embodiment) spring support portions 113a that each extend along the inner periphery of the corresponding spring-accommodating slot and are aligned at intervals (evenly spaced) in the circumferential direction, a plurality of (e.g., three in the present embodiment) spring support portions 113b that each extend along the outer periphery of the corresponding spring-accommodating slot and are aligned at intervals (evenly spaced) in the circumferential direction so as to face the corresponding spring support portion 113a in the radial direction of the third plate member 113, and a plurality of (e.g., three in the present embodiment) spring contact portions (third contact portions) 113c. The spring contact portions 113c of the third plate member 113 are provided one by one between the spring support portions 113a and 113b (spring-accommodating slots) that are adjacent each other along the circumferential direction.

The first intermediate member 12 includes an elastic-body support member 121 and a coupling member 122 as depicted in FIG. 2. The elastic-body support member 121 is annularly formed so as to support (guide) outer peripheral portions of the first and second outer springs SP11 and SP12, side portions thereof (side portions at the right in FIG. 2) on the lockup piston 80 side (engine EG side), and outer-peripheral side portions thereof on the turbine runner 5 side (transmission TM side). The elastic-body support member 121 is rotatably supported (aligned) by the cylindrical portion 111b of the first plate member 111 of the drive member 11, and is disposed in an outer peripheral region in the fluid transmission chamber 9. Disposing the first intermediate member 12 in the outer peripheral region in the fluid transmission chamber 9 in this manner enables the moment of inertia of the first intermediate member 12 to be increased. The elastic-body support member 121 has a plurality of (e.g., two at an interval of 180° in the present embodiment) spring contact portions 121c arranged at intervals in the circumferential direction. The spring contact portions 121c are each extended from a side portion of the elastic-body support member 121 on the lockup piston 80 side toward the turbine runner 5 in the axial direction.

The coupling member 122 constituting the first intermediate member 12 has an annular fixed portion 122a that is fixed to the turbine shell 50 of the turbine runner 5 by welding, for example, a plurality of (e.g., two at an interval of 180° in the present embodiment) first spring contact portions 122c that are extended in the axial direction from the outer periphery of the fixed portion 122a at intervals in the circumferential direction, a plurality of (e.g., four in the present embodiment) second spring contact portions 122d that are extended in the axial direction from between the first spring contact portions 122c at the outer periphery of the fixed portion 122a, and a short cylindrical support portion 122s that is extended in the axial direction from the inner periphery of the fixed portion 122a toward the same side as the first and second spring contact portions 122c and 122d. The second spring contact portions 122d of the coupling member 122 are formed symmetrically about the axis of the coupling member 122 so that two of them (a pair) are positioned close to each other (see FIG. 3), and two second spring contact portions 122d in each pair oppose each other at an interval corresponding to the natural length of the intermediate springs SPm, for example.

The second intermediate member 14 has an annular supported portion 14a, a plurality of (e.g., three at an interval of 120° in the present embodiment) first spring contact portions 14c that are extended in the axial direction from the inner periphery of the supported portion 14a at intervals in the circumferential direction, and a plurality of (e.g., four in the present embodiment) second spring contact portions 14d that are extended in the axial direction from the outer periphery of the supported portion 14a toward the same side as the first spring contact portions 14c. The second spring contact portions 14d of the second intermediate member 14 are formed symmetrically about the axis of the second intermediate member 14 so that two of them (a pair) are positioned close to each other (see FIG. 3), and two second spring contact portions 14d in each pair oppose each other at an interval corresponding to the natural length of the intermediate spring SPm, for example.

As depicted in FIG. 2, the second intermediate member 14 is disposed so that the supported portion 14a is positioned between the third plate member 113 of the drive member 11 and the turbine runner 5 in the axial direction, and is rotatably supported by the coupling member 122 of the first intermediate member 12 fixed to the turbine runner 5. In the present embodiment, a recess into which the support portion 122s of the coupling member 122 is fitted is formed in the supported portion 14a of the second intermediate member 14, and the second intermediate member 14 is rotatably supported by the support portion 122s. The supported portion 14a of the second intermediate member 14 is in contact with the distal end of the support portion 122s, which restricts the movement of the second intermediate member 14 toward the turbine runner 5. Furthermore, on the outer periphery of the third plate member 113, a plurality of movement restricting protrusions 113s protruding from a surface on the turbine runner 5 side toward the second intermediate member 14 are formed at intervals in the circumferential direction. Thus, the supported portion 14a of the second intermediate member 14 is in contact with the movement restricting protrusions 113s of the third plate member 113, which restricts the movement of the second intermediate member 14 in a direction away from the turbine runner 5 (toward the lockup piston 80).

The driven member 16, structured as a plate-like annular member, is disposed between the second plate member 112 and the third plate member 113 of the drive member 11 in the axial direction as depicted in FIG. 2, and is fixed to the damper hub 7 (the second support portion 72 in the present embodiment) via rivets. Accordingly, the driven member 16 rotates integrally with the damper hub 7. The driven member 16 has a plurality of (e.g., three in the present embodiment) spring-accommodating slots that each extend in a circular arc shape and are disposed at intervals (evenly spaced) in the circumferential direction, a plurality of (e.g., three in the present embodiment) inner-spring contact portions (inner contact portions) 16ci that are formed at intervals in the circumferential direction so as to be positioned close to the inner periphery of the driven member 16, and a plurality of (e.g., four in the present embodiment) outer-spring contact portions (outer contact portions) 16co that are aligned radially outward of inner-spring contact portions 16ci at intervals (evenly spaced) in the circumferential direction and extend in the axial direction from the turbine runner 5 side toward the lockup piston 80. The inner-spring contact portions 16ci of the driven member 16 are provided one by one between the spring-accommodating slots that are adjacent each other along the circumferential direction.

As depicted in FIG. 2, each first outer spring SP11 is paired with a second outer spring SP12 (acts in series). The first and second outer springs SP11 and SP12 are supported by the elastic-body support member 121 of the first intermediate member 12 so as to be alternately aligned along the circumferential direction of the first intermediate member 12. The spring contact portions 111c of the first plate member 111 of the drive member 11 are each in contact with an end of the corresponding first outer spring SP11 or an end of the corresponding second outer spring SP12 in an assembled state of the damper device 10. Furthermore, as depicted in FIG. 3, each spring contact portion 121c of the elastic-body support member 121 is interposed between the first and second outer springs SP11 and SP12 that are paired and adjacent each other (act in series), and is in contact with ends of both springs. As depicted in FIG. 3, each first spring contact portion 122c of the coupling member 122 is also interposed between the first and second outer springs SP11 and SP12 that are paired and adjacent each other, and is in contact with ends of both springs.

In other words, in the assembled state of the damper device 10, one end (end close to the intermediate spring SPm in FIG. 3) of each first outer spring SP11 is in contact with the corresponding spring contact portion 111c of the drive member 11, and the other end (end close to the second outer spring SP12 in FIG. 3) of the first outer spring SP11 is in contact with the corresponding spring contact portion 121c and the corresponding first spring contact portion 122c of the first intermediate member 12. In the assembled state of the damper device 10, one end (end close to the first outer spring SP11 in FIG. 3) of each second outer spring SP12 is in contact with the corresponding spring contact portion 121c and the corresponding first spring contact portion 122c of the first intermediate member 12, and the other end (end close to the intermediate spring SPm in FIG. 3) of the second outer spring SP12 is in contact with the corresponding spring contact portion 111c of the drive member 11.

Furthermore, similarly to each spring contact portion 111c of the drive member 11, each outer-spring contact portion 16co of the driven member 16 is interposed between the corresponding first outer springs SP11 and the corresponding second outer spring SP12, and the outer-spring contact portions 16co of the driven member 16 are each in contact with an end of the corresponding first outer spring SP11 or an end of the corresponding second outer spring SP12. In other words, in the assembled state of the damper device 10, one end (end close to the intermediate spring SPm) of each first outer spring SP11 and the other end (end close to the intermediate spring SPm) of the second outer spring SP12 that is paired with this first outer spring SP11 are each in contact with the corresponding outer-spring contact portion 16co of the driven member 16. Consequently, the driven member 16 is coupled to the drive member 11 via the first outer springs SP11, the first intermediate member 12 (the elastic-body support member 121 and the coupling member 122), and the second outer springs SP12.

The coupling member 122 of the first intermediate member 12 is fixed to the turbine runner 5, and thus the first intermediate member 12 and the turbine runner 5 are coupled so as to rotate integrally. Coupling the turbine runner 5 (and the turbine hub 52) to the first intermediate member 12 in this manner enables the substantial moment of inertia (sum of the moments of inertia of the elastic-body support member 121, the coupling member 122, and the turbine runner 5, for example) of the first intermediate member 12 to be further increased. Coupling the turbine runner 5 to the first intermediate member 12 disposed radially outward of the first and second inner springs SP21 and SP22, i.e., in the outer peripheral region in the fluid transmission chamber 9, can prevent the coupling member 122 from passing through between the third plate member 113 of the drive member 11 or the first and second inner springs SP21 and SP22 and the turbine runner 5 in the axial direction. Accordingly, the axial length of the damper device 10 and consequently the axial length of the starting device 1 can be more satisfactorily prevented from increasing.

In contrast, as depicted in FIGS. 2 and 3, the spring support portions 112a of the second plate member 112 each support (guide), from the inner peripheral side, a lockup piston 80-side side portion of the corresponding pair of the first and second inner springs SP21 and SP22 (one for each). The spring support portions 112b each support (guide), from the outer peripheral side, the lockup piston 80-side side portion of the corresponding pair of the first and second inner springs SP21 and SP22. Furthermore, as depicted in FIG. 2, the spring support portions 113a of the third plate member 113 each support (guide), from the inner peripheral side, a turbine runner 5-side side portion of the corresponding pair of the first and second inner springs SP21 and SP22 (one for each). The spring support portions 113b each support (guide), from the outer peripheral side, the turbine runner 5-side side portion of the corresponding pair of the first and second inner springs SP21 and SP22. In other words, each first inner spring SP21 is paired with a second inner spring SP22 (acts in series), and the first and second inner springs SP21 and SP22 are supported by the spring support portions 112a and 112b of the second plate member 112 and the spring support portions 113a and 113b of the third plate member 113 that constitute the drive member 11 so as to be alternately aligned in the circumferential direction (the circumferential direction of the second intermediate member 14).

Furthermore, as depicted in FIG. 3, in the assembled state of the damper device 10, each spring contact portion 112c of the second plate member 112 is interposed between the first and second inner springs SP21 and SP22 that are supported by the different spring-accommodating slots 112w (spring support portions 112a, 112b, 113a, and 113b) and that are not paired (do not act in series), and is in contact with ends of both springs. Similarly, in the assembled state of the damper device 10, each spring contact portion 113c of the third plate member 113 is interposed between the first and second inner springs SP21 and SP22 that (are not paired) are supported by the different spring support portions 112a, 112b, 113a, and 113b (spring-accommodating slots), and is in contact with ends of both springs. As depicted in FIG. 3, each first spring contact portion 14c of the second intermediate member 14 is interposed between the first and second inner springs SP21 and SP22 that are paired (act in series), and is in contact with ends of both springs.

In other words, in the assembled state of the damper device 10, one end of each first inner spring SP21 is in contact with the corresponding spring contact portion 112c and the corresponding spring contact portion 113c of the drive member 11, and the other end of the first inner spring SP21 is in contact with the corresponding first spring contact portion 14c of the second intermediate member 14. Furthermore, in the assembled state of the damper device 10, one end of each second inner spring SP22 is in contact with the corresponding first spring contact portion 14c of the second intermediate member 14, and the other end of the second inner spring SP22 is in contact with the corresponding spring contact portion 112c and the corresponding spring contact portion 113c of the drive member 11. Herein, spring sheets Ss may be disposed as depicted in FIG. 3 between the first spring contact portion 14c and the other end of the first inner spring SP21 and between the first spring contact portion 14c and the one end of the second inner spring SP22.

In the assembled state of the damper device 10, similarly to the spring contact portions 112c and 113c of the drive member 11, each inner-spring contact portion 16ci of the driven member 16 is interposed between the first and second inner springs SP21 and SP22 that are not paired (do not act in series), and is in contact with ends of both springs. Accordingly, in the assembled state of the damper device 10, the one end of each first inner spring SP21 is also in contact with the corresponding inner-spring contact portion 16ci of the driven member 16, and the other end of the second inner spring SP22 is also in contact with the corresponding inner-spring contact portion 16ci of the driven member 16. Consequently, the driven member 16 is coupled to the drive member 11 via the first inner springs SP21, the second intermediate member 14, and the second inner springs SP22.

Figure 5:
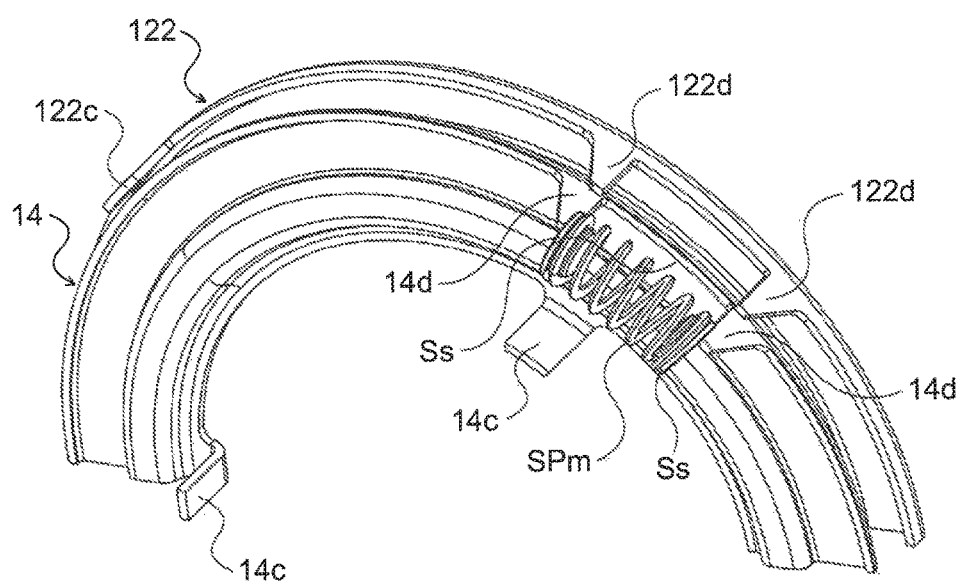
FIG. 5 is a perspective view illustrating components of the damper device of the present disclosure.

In the assembled state of the damper device 10, each intermediate spring SPm is supported from both sides by a pair of the second spring contact portions 122d of the first intermediate member 12 (coupling member 122), and is also supported from both sides by a pair of the second spring contact portions 14d of the second intermediate member 14. Accordingly, the first intermediate member 12 and the second intermediate member 14 are coupled to each other via the intermediate springs SPm. In the present embodiment, between each end of the intermediate springs SPm and the second spring contact portions 14d and 122d, the spring sheet Ss is disposed as depicted in FIGS. 1 and 5.

Furthermore, as depicted in FIG. 1, the damper device 10 includes a first stopper 21 that restricts relative rotation between the first intermediate member 12 and the driven member 16 and deformation of the second outer springs SP12, a second stopper 22 that restricts relative rotation between the second intermediate member 14 and the driven member 16 and deformation of the second inner springs SP22, and a third stopper 23 that restricts relative rotation between the drive member 11 and the driven member 16. The first and second stoppers 21 and 22 are structured so as to restrict relative rotation of the associated rotating elements and deformation of the associated springs substantially simultaneously when input torque transmitted from the engine EG to the drive member 11 has reached a predetermined torque (first threshold) T1 that is smaller than a torque T2 (second threshold) corresponding to the maximum torsional angle θmax of the damper device 10. The third stopper 23 is structured so as to restrict relative rotation between the drive member 11 and the driven member 16 when torque input to the drive member 11 has reached the torque T2 corresponding to the maximum torsional angle θmax. Accordingly, the damper device 10 has damping characteristics in two stages.

In the present embodiment, as depicted in FIG. 2, the first stopper 21 is structured with a plurality of stopper portions 122x that are extended in the axial direction from the coupling member 122 constituting the first intermediate member 12 toward the lockup piston 80 at intervals in the circumferential direction and a plurality of cutout portions 161x that are formed in the outer periphery of the driven member 16 at intervals in the circumferential direction and each extend in a circular arc shape. In the assembled state of the damper device 10, each stopper portion 122x of the first intermediate member 12 (coupling member 122) is inserted into any one of a plurality of slits 14v each having a circular arc shape and formed in the outer periphery of the supported portion 14a of the second intermediate member 14 at intervals in the circumferential direction, and is disposed so as not to be in contact with wall surfaces of the driven member 16 that, in the corresponding cutout portion 161x of the driven member 16, define both ends of the cutout portion 161x. Accordingly, when each stopper portion 122x of the coupling member 122 comes into contact with one of the wall surfaces defining both ends of the cutout portion 161x as a result of relative rotation between the first intermediate member 12 and the driven member 16, the relative rotation between the first intermediate member 12 and the driven member 16 and deformation of the second outer springs SP12 are restricted. Note that, in the present embodiment, during a period until relative rotation between the drive member 11 and the driven member 16 is restricted by the third stopper 23, each stopper portion 122x of the first intermediate member 12 does not come into contact with wall surfaces of the second intermediate member 14 defining both ends of each slit 14v.

In the present embodiment, as depicted in FIG. 2, the second stopper 22 is structured with a plurality of slits 14x that are formed in the inner periphery of the supported portion 14a of the second intermediate member 14 at intervals in the circumferential direction and that each extend in a circular arc shape and a plurality of stopper portions 162x that are extended in the axial direction from the driven member 16 toward the turbine runner 5 at intervals in the circumferential direction. In the assembled state of the damper device 10, each stopper portion 162x of the driven member 16 is inserted into any one of a plurality of slits 113v each having a circular arc shape and formed in the outer periphery of the third plate member 113 of the drive member 11 at intervals in the circumferential direction, and is disposed so as not to be in contact with wall surfaces of the second intermediate member 14 that, in the corresponding slit 14x of the second intermediate member 14, define both ends of the slit 14x. Accordingly, when each stopper portion 162x of the driven member 16 comes into contact with one of the wall surfaces defining both ends of the slit 14x of the second intermediate member 14 as a result of relative rotation between the second intermediate member 14 and the driven member 16, the relative rotation between the second intermediate member 14 and the driven member 16 and deformation of the second inner springs SP22 are restricted. Note that, in the present embodiment, during a period until relative rotation between the drive member 11 and the driven member 16 is restricted by the third stopper 23, each stopper portion 162x of the driven member 16 does not come into contact with wall surfaces of the third plate member 113 defining both ends of each slit 13v.

Furthermore, in the present embodiment, as depicted in FIG. 2, the third stopper 23 is structured with collars attached to a plurality of rivets 123 that couple the second and third plate members 112 and 113 constituting the drive member 11 and a plurality of cutout portions 163x each having a circular arc shape formed on the driven member 16 at intervals in the circumferential direction. In the assembled state of the damper device 10, the rivets 123 and the collars are each disposed so as not to be in contact with wall surfaces of the driven member 16 that, in the corresponding cutout portion 163x of the driven member 16, define both ends of the cutout portion 163x. Accordingly, when each collar comes into contact with one of the wall surfaces defining both ends of the cutout portion 163x as a result of relative rotation between the drive member 11 and the driven member 16, the relative rotation between the drive member 11 and the driven member 16 is restricted.

The following describes operation of the damper device 10. In the starting device 1, when lockup by the lockup clutch 8 is released, for example, rotational torque (power) transmitted from the engine EG to the front cover 3 is transmitted to the input shaft IS of the transmission TM through a path of the pump impeller 4, the turbine runner 5, the first intermediate member 12, the second outer springs SP12, the driven member 16, and the damper hub 7, and also through a path of the pump impeller 4, the turbine runner 5, the first intermediate member 12, the intermediate springs SPm, the second intermediate member 14, the second inner springs SP22, the driven member 16, and the damper hub 7. In contrast, when lockup is performed by the lockup clutch 8 of the starting device 1, while the drive member 11 reaches the torque T1, i.e., during a period when deformation is allowed in all of the first and second outer springs SP11 and SP12, the first and second inner springs SP21 and SP22, and the intermediate springs SPm, rotational torque (input torque) transmitted from the engine EG to the drive member 11 via the front cover 3 and the lockup clutch 8 (lockup piston 80) is transmitted to the driven member 16 and the damper hub 7 via all the springs SP11 to SPm.

Figure 6:
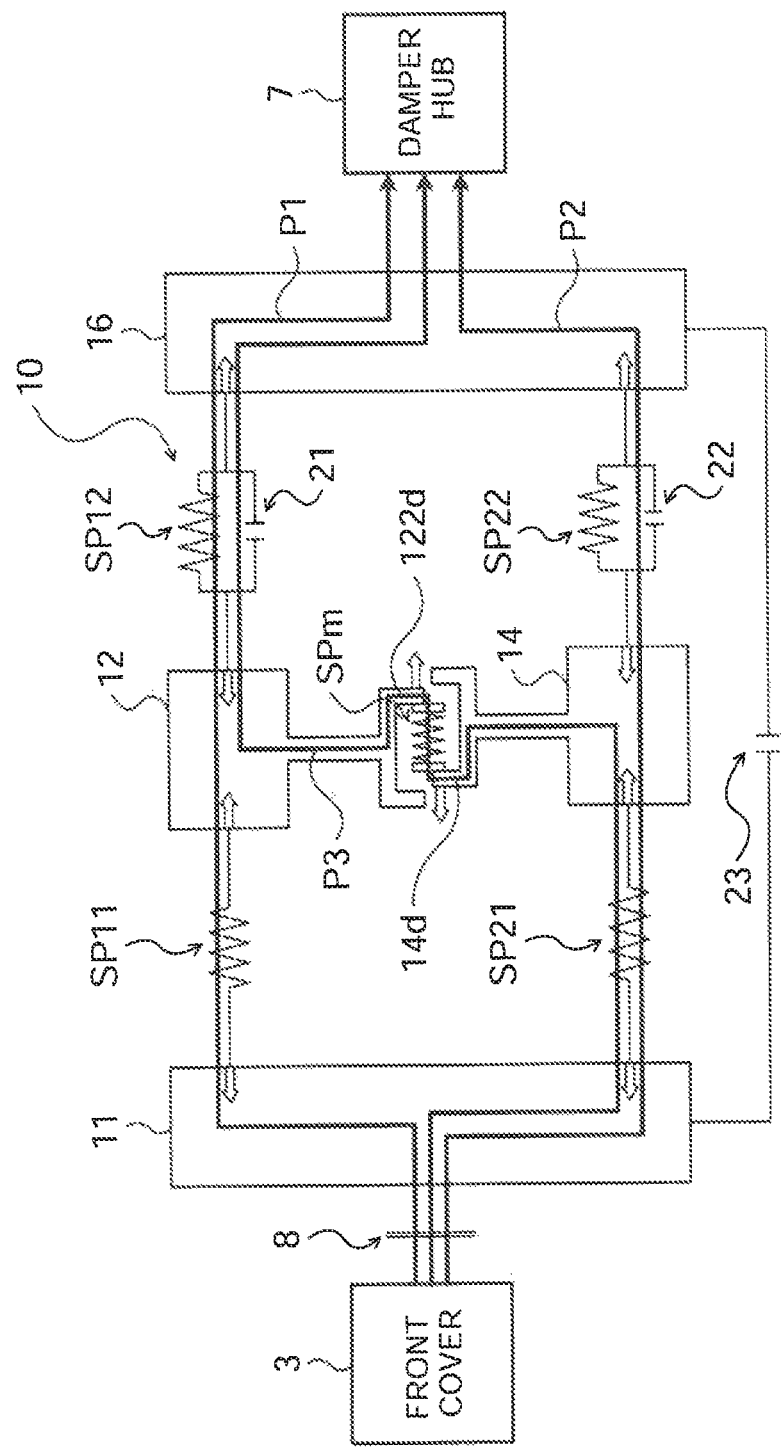
FIG. 6 is a schematic diagram illustrating torque transfer paths in the damper device of the present disclosure.

In other words, during a period until the input torque reaches the torque T1 while lockup is being performed, the first outer springs (first elastic body) SP11 transmit rotational torque from the drive member 11 to the first intermediate member 12, and the second outer springs (second elastic body) SP12 transmit the rotational torque from the first intermediate member 12 to the driven member 16. The first inner springs (third elastic body) SP21 transmit rotational torque from the drive member 11 to the second intermediate member 14, and the second inner springs (fourth elastic body) SP22 transmit the rotational torque from the second intermediate member 14 to the driven member 16. Thus, the damper device 10 has, as torque transfer paths between the drive member 11 and the driven member 16, a first torque transfer path P1 including the first outer springs SP11, the first intermediate member 12, and the second outer springs SP12 and a second torque transfer path P2 including the first inner springs SP21, the second intermediate member 14, and the second inner springs SP22 as depicted in FIG. 6.

In the damper device 10, as described above, the spring constants $k_{11}$, $k_{12}$, $k_{21}$, and $k_{22}$ of the first and second outer springs SP11 and SP12 and the first and second inner springs SP21 and SP22 satisfy the relation of $k_{11} < k_{12} < k_{22} < k_{21}$. Accordingly, when torque is transmitted to the drive member 11 during a period until the input torque reaches the torque T1 while lockup is being performed, the second intermediate member 14 (slightly) twists toward the moving direction side (downstream) in the rotation direction (rotation direction when a vehicle moves forward) with respect to the first intermediate member 12 as depicted in FIG. 6. Consequently, each intermediate spring SPm is pressed, by one of a pair of the second spring contact portions 14d of the second intermediate member 14, which is opposite to the spring contact portion 14d on the moving direction side in the rotation direction, toward one of a pair of the second spring contact portions 122d of the first intermediate member 12, which is on the moving direction side in the rotation direction. In other words, during a period until the input torque reaches the torque T1 while lockup is being performed, the intermediate springs SPm transmit, to the first intermediate member 12, part of torque (part of average torque) transmitted from the drive member 11 to the second intermediate member 14 via the first inner springs SP21. Thus, the damper device 10 has a third torque transfer path P3 including the first inner springs SP21, the second intermediate member 14, the intermediate springs SPm, the first intermediate member 12, and the second outer springs SP12.

Consequently, during a period until torque input to the drive member 11 reaches the torque T1 while lockup is being performed, through the first, second, and third torque transfer paths P1, P2, and P3, torque is transmitted from the drive member 11 to the driven member 16. More specifically, during a period when deformation is allowed in all of the first and second outer springs SP11 and SP12, the first and second inner springs SP21 and SP22, and the intermediate springs SPm, rotational torque from the first outer springs SP11 and rotational torque from the first inner springs SP21, the second intermediate member 14, and the intermediate springs SPm are transmitted to the second outer springs SP12. Rotational torque from the first inner springs SP21 is transmitted to the second inner springs SP22. During a period deformation is allowed in all of the first and second outer springs SP11 and SP12, the first and second inner springs SP21 and SP22, and the intermediate springs SPm, fluctuations of torque transmitted to the drive member 11 are damped (absorbed) by the springs SP11 to SPm. This makes it possible to satisfactorily improve the vibration damping performance of the damper device 10 when input torque transmitted to the drive member 11 is relatively small and the rotational speed of the drive member 11 is low.

When torque input to the drive member 11 has reached the torque T1 and the first and second stoppers 21 and 22 are activated, the first stopper 21 restricts relative rotation between the first intermediate member 12 and the driven member 16 and deformation of the second outer springs SP12, and the second stopper 22 restricts relative rotation between the second intermediate member 14 and the driven member 16 and deformation of the second inner springs SP22. This restricts the relative rotation of the first and second intermediate members 12 and 14 with respect to the driven member 16, thereby restricting deformation of the intermediate springs SPm. Thus, after the torque input to the drive member 11 has reached the torque T1, until the input torque reaches the torque T2 and the third stopper 23 is activated, the first outer springs SP11 and the first inner springs SP21 act in parallel to damp (absorb) fluctuations of torque transmitted to the drive member 11.

The following describes a design procedure for the damper device 10.

As described above, in the damper device 10, when deformation is allowed in all of the first and second outer springs SP11 and SP12, the first and second inner springs SP21 and SP22, and the intermediate springs SPm, torque (average torque) is transmitted via all the springs SP11 to SPm between the drive member 11 and the driven member 16. The inventors conducted intensive research and analyses on the damper device 10 having complex torque transfer paths that are formed neither in series nor in parallel as described above, and consequently found that the entire device of the damper device 10 has two natural frequencies when deformation is allowed in all the springs SP11 to SPm. According to the research and analyses conducted by the inventors, also in the damper device 10, when resonance (resonance of the first intermediate member 12 when the first and second intermediate members 12 and 14 vibrate in the same phase in the present embodiment) occurs at a lower natural frequency (natural frequency on the low rotational-speed side (low frequency side)) of the two natural frequencies depending on the frequency of vibrations transmitted to the drive member 11, the phase of vibrations transmitted from the second outer springs SP12 to the driven member 16 and the phase of vibrations transmitted from the second inner springs SP22 to the driven member 16 shift apart. Accordingly, as the rotational speed of the drive member 11 increases after the resonance has occurred at the lower natural frequency of the two natural frequencies, one of a set of vibrations transmitted from the second outer springs SP12 to the driven member 16 and a set of vibrations transmitted from the second inner springs SP22 to driven member 16 cancels at least part of the other set of vibrations.

Based on these findings, the inventors formulated an equation of motion of Formula (1) below for a vibration system including the damper device 10 in a state in which torque has been transmitted from the engine (internal combustion engine) EG to the drive member 11 by performing lockup. In Formula (1), "$J_1$" is the moment of inertia of the drive member 11, "$J_{21}$" is the moment of inertia of the first intermediate member 12, "$J_2$" is the moment of inertia of the second intermediate member 14, and "$J_3$" is the moment of inertia of the driven member 16. "$\theta_1$" is the torsional angle of the drive member 11, "$\theta_{21}$" is the torsional angle of the first intermediate member 12, "$\theta_{22}$" is the torsional angle of the second intermediate member 14, and "$\theta_3$" is the torsional angle of the driven member 16. Furthermore, "$k_1$" is a combined spring constant of the first outer springs SP11 that act in parallel between the drive member 11 and the first intermediate member 12, "$k_2$" is a combined spring constant of the second outer springs SP12 that act in parallel between the first intermediate member 12 and the driven member 16, "$k_3$" is a combined spring constant of the first inner springs SP21 that act in parallel between the drive member 11 and the second intermediate member 14, "$k_4$" is a combined spring constant of the second inner springs SP22 that act in parallel between the second intermediate member 14 and the driven member 16, "$k_5$" is a combined spring constant (stiffness) of the intermediate springs SPm that act in parallel between the first intermediate member 12 and the second intermediate member 14, "$k_R$" is stiffness i.e., a spring constant in the transmission TM or a drive shaft, for example, disposed between the driven member 16 and wheels of the vehicle, and "T" is input torque transmitted from the engine EG to the drive member 11.

$$\begin{pmatrix} J_1 & 0 & 0 & 0 \\ 0 & J_{21} & 0 & 0 \\ 0 & 0 & J_{22} & 0 \\ 0 & 0 & 0 & J_3 \end{pmatrix} \begin{pmatrix} \ddot{\theta}_1 \\ \ddot{\theta}_{21} \\ \ddot{\theta}_{22} \\ \ddot{\theta}_3 \end{pmatrix} + \quad (1)$$

$$\begin{pmatrix} k_1+k_3 & -k_1 & -k_3 & 0 \\ -k_1 & k_1+k_2+k_5 & -k_5 & -k_2 \\ -k_3 & -k_5 & k_3+k_4+k_5 & -k_4 \\ 0 & -k_2 & -k_4 & k_2+k_4+k_R \end{pmatrix} \begin{pmatrix} \theta_1 \\ \theta_{21} \\ \theta_{22} \\ \theta_3 \end{pmatrix} = \begin{pmatrix} T \\ 0 \\ 0 \\ 0 \end{pmatrix}$$

Furthermore, the inventors assumed that the input torque T periodically oscillates as represented by Formula (2) below, and also that the torsional angle $\theta_1$ of the drive member 11, the torsional angle $\theta_{21}$ of the first intermediate member 12, the torsional angle $\theta_{22}$ of the second intermediate member 14, and the torsional angle $\theta_3$ of the driven member 16 periodically respond (oscillate) as represented by Formula (3) below. In Formulae (2) and (3), "$\omega$" is the angular frequency of periodic fluctuations (oscillations) of the input torque T. In Formula (3), "$\Theta_1$" is the amplitude (vibration amplitude, i.e., the maximum torsional angle) of vibrations of the drive member 11 that are generated when torque from the engine EG is transmitted, "$\Theta_{21}$" is the amplitude (vibration amplitude) of vibrations of the first intermediate member 12 that are generated when torque from the engine EG is transmitted to the drive member 11, "$\Theta_{22}$" is the amplitude (vibration amplitude) of vibrations of the second intermediate member 14 that are generated when torque from the engine EG is transmitted to the drive member 11, and "$\Theta_3$" is the amplitude (vibration amplitude) of vibrations of the driven member 16 that are generated when torque from the engine EG is transmitted to the drive member 11. Under these assumptions, Formulae (2) and (3) are substituted into Formula (1), and both sides are divided by "sin $\omega t$", whereby the identity of Formula (4) below can be obtained.

$$T = T_0 \sin\omega t \quad (2)$$

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \sin\omega t \quad (3)$$

-continued $$\begin{pmatrix} -\omega^2 J_1 + \\ k_1 + k_3 & -k_1 & -k_3 & 0 \\ & -\omega^2 J_{21} + k_1 + \\ -k_1 & k_2 + k_5 & -k_5 & -k_2 \\ & & -\omega^2 J_{22} + k_3 + \\ -k_3 & -k_5 & k_4 + k_5 & -k_4 \\ & & & -\omega^2 J_3 + k_2 + \\ 0 & -k_2 & -k_4 & k_4 + k_R \end{pmatrix} \begin{pmatrix} \Theta_1 \\ \Theta_{21} \\ \Theta_{22} \\ \Theta_3 \end{pmatrix} = \begin{pmatrix} T_0 \\ 0 \\ 0 \\ 0 \end{pmatrix}$$ (4)

The inventors focused on the fact that when the vibration amplitude $\Theta_3$ of the driven member 16 in Formula (4) becomes zero, vibrations from the engine EG are damped by the damper device 10, whereby theoretically vibrations are not transmitted to the transmission TM or the drive shaft, for example, in stages posterior to the driven member 16. In view of this, the inventors solved the identity of Formula (4) for the vibration amplitude $\Theta_3$ and assumed $\Theta_3=0$ to obtain the conditional expression of Formula (5) below. When the relation of Formula (5) holds, vibrations from the engine EG transmitted from the drive member 11 to the driven member 16 through the first, second, and third torque transfer paths P1, P2, and P3 cancel each other, so that the vibration amplitude $\Theta_3$ of the driven member 16 theoretically becomes zero.

$$\omega^2 = \frac{k_5 \cdot (k_1 + k_3) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2}$$ (5)

Figure 7:
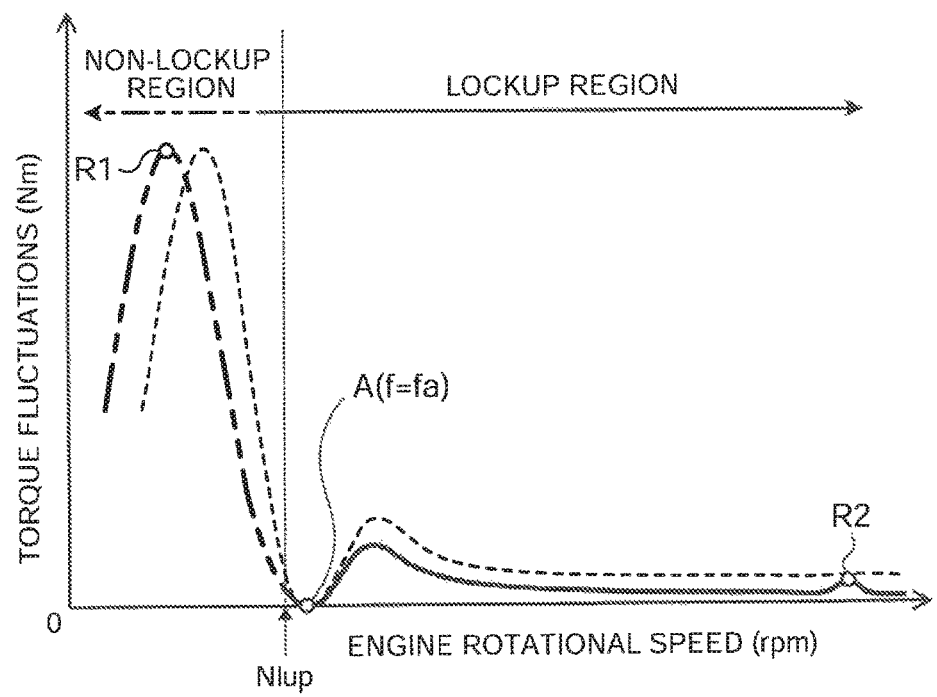
FIG. 7 is an explanatory graph illustrating a relation between the rotational speed of an engine and theoretical torque fluctuations in an output element of the damper device.

From this analysis result, it can be understood that, in the damper device 10 having the above-described structure, by the occurrence of resonance at the lower natural frequency of the two natural frequencies, the phase of vibrations transmitted from the second outer springs SP12 to the driven member 16 and the phase of vibrations transmitted from the second inner springs SP22 to the driven member 16 are shifted 180° (are reversed) from each other, whereby both sets of vibrations are mutually canceled, so that an antiresonance point A where the vibration amplitude $\Theta_3$ (torque fluctuations) of the driven member 16 theoretically becomes zero can be set as depicted in FIG. 7. When the frequency at the antiresonance point A is "fa" and "ω=2πfa" is substituted into Formula (5), the frequency fa at the antiresonance point A can be represented by Formula (6) below. Herein, FIG. 7 illustrates relations between the rotational speed of the engine EG and the theoretical (on the assumption that hysteresis does not exist) vibration amplitudes (torque fluctuations) in the driven members of the damper device of the present disclosure and the damper device (damper device described in Published Japanese Translation of PCT Application No. 2012-506006, hereinafter, called "damper device of the comparative example") in which the intermediate springs SPm are omitted.

$$fa = \frac{1}{2\pi} \sqrt{\frac{k_5 \cdot (k_1 + k_3) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2}}$$ (6)

When it is assumed that the torsional angle $\theta_1$ of the drive member 11 and the torsional angle $\theta_2$ of the driven member 16 are zero and both displacements of the drive member 11 and the driven member 16 are zero, Formula (1) can be modified into Formula (7) below. Furthermore, assuming that the first and second intermediate members 12 and 14 harmonically vibrate as represented by Formula (8) below, Formula (8) is substituted into Formula (7) and both sides are divided by "sin ωt", whereby the identity of Formula (9) below can be obtained.

$$\begin{pmatrix} J_{21} & 0 \\ 0 & J_{22} \end{pmatrix} \begin{pmatrix} \ddot{\theta}_{21} \\ \ddot{\theta}_{22} \end{pmatrix} + \begin{pmatrix} k_1 + k_2 + k_5 & -k_5 \\ -k_5 & k_3 + k_4 + k_5 \end{pmatrix} \begin{pmatrix} \theta_{21} \\ \theta_{22} \end{pmatrix} = \begin{pmatrix} 0 \\ 0 \end{pmatrix}$$ (7)

$$\begin{pmatrix} \theta_{21} \\ \theta_{22} \end{pmatrix} = \begin{pmatrix} \Theta_{21} \\ \Theta_{22} \end{pmatrix} \sin\omega t$$ (8)

$$\begin{pmatrix} -\omega^2 J_{21} + k_1 + k_2 + k_5 & -k_5 \\ -k_5 & -\omega^2 J_{22} + k_3 + k_4 + k_5 \end{pmatrix} \begin{pmatrix} \Theta_{21} \\ \Theta_{22} \end{pmatrix} = \begin{pmatrix} 0 \\ 0 \end{pmatrix}$$ (9)

When the first and second intermediate members 12 and 14 harmonically vibrate, the amplitudes $\Theta_{21}$ and $\Theta_{22}$ do not become zero, so that the determinant of the square matrix on the left side of Formula (9) is zero, which requires the conditional expression of Formula (10) below to hold. Formula (10) is a quadratic equation for square values $\omega^2$ of two natural angular frequencies of the damper device 10. Thus, two natural angular frequencies $\omega_1$ and $\omega_2$ of the damper device 10 are represented by Formulae (11) and (12) below, and $\omega_1 < \omega_2$ holds. Consequently, when the frequency of resonance (resonance point R1) that generates the antiresonance point A, i.e., the natural frequency of the first intermediate member 12, is "$f_{21}$", and the frequency of resonance (resonance point R2) that occurs on the higher rotational-speed side of the antiresonance point A, i.e., the natural frequency of the second intermediate member 14, is "$f_{22}$", the natural frequency $f_{21}$ on the low rotational-speed side (low frequency side) is represented by Formula (13) below, and the natural frequency $f_{22}$ ($f_{22} > f_{21}$) on the high rotational-speed side (high frequency side) is represented by Formula (14) below.

$$(-\omega^2 J_{21} + k_1 + k_2 + k_5)(-\omega^2 J_{22} + k_3 + k_4 + k_5) - k_5^2 = 0$$ (10)

$$\omega_1 = \sqrt{\frac{1}{2} \left\{ \frac{k_1 + k_2 + k_5}{J_{21}} + \frac{k_3 + k_4 + k_5}{J_{22}} - \sqrt{\left(\frac{k_3 + k_4 + k_5}{J_{22}} - \frac{k_1 + k_2 + k_5}{J_{21}}\right)^2 + \frac{4k_5^2}{J_{21} J_{22}}} \right\}}$$ (11)

$$\omega_2 = \sqrt{\frac{1}{2} \left\{ \frac{k_1 + k_2 + k_5}{J_{21}} + \frac{k_3 + k_4 + k_5}{J_{22}} + \sqrt{\left(\frac{k_3 + k_4 + k_5}{J_{22}} - \frac{k_1 + k_2 + k_5}{J_{21}}\right)^2 + \frac{4k_5^2}{J_{21} J_{22}}} \right\}}$$ (12)

$$f_{21} = \frac{1}{2\pi} \sqrt{\frac{k_1 + k_2 + k_5}{2J_{21}} + \frac{k_3 + k_4 + k_5}{2J_{22}} - \sqrt{\left(\frac{k_3 + k_4 + k_5}{2J_{22}} - \frac{k_1 + k_2 + k_5}{2J_{21}}\right)^2 + \frac{k_5^2}{J_{21} J_{22}}}}$$ (13)

$$f_{22} = \frac{1}{2\pi} \sqrt{\frac{\frac{k_1+k_2+k_5}{2J_{21}} + \frac{k_3+k_4+k_5}{2J_{22}} + }{\sqrt{\left(\frac{k_3+k_4+k_5}{2J_{22}} - \frac{k_1+k_2+k_5}{2J_{21}}\right)^2 + \frac{k_5^2}{J_{21}J_{22}}}}} \quad (14)$$

The equivalent stiffness $k_{eq}$ of the damper device 10 when deformation is allowed in all of the first and second outer springs SP11 and SP12, the first and second inner springs SP21 and SP22, and the intermediate springs SPm can be obtained as follows. Specifically, assuming that a constant input torque (static external force) of $T=T_0$ is transmitted to the drive member 11 and also assuming that the equilibrium relation of Formula (15) below holds, the identity of Formula (16) below can be obtained by substituting $T=T_0$ and Formula (15) into Formula (1).

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \quad (15)$$

$$\begin{pmatrix} k_1+k_3 & -k_1 & -k_3 & 0 \\ -k_1 & k_1+k_2+k_5 & -k_5 & -k_2 \\ -k_3 & -k_5 & k_3+k_4+k_5 & -k_4 \\ 0 & -k_2 & -k_4 & k_2+k_4+k_R \end{pmatrix} \begin{pmatrix} \Theta_1 \\ \Theta_{21} \\ \Theta_{22} \\ \Theta_3 \end{pmatrix} = \begin{pmatrix} T_0 \\ 0 \\ 0 \\ 0 \end{pmatrix} \quad (16)$$

Furthermore, among the torque $T_0$, the equivalent stiffness $k_{eq}$ of the damper device 10, the vibration amplitude (torsional angle) $\Theta_1$ of the drive member 11, and the vibration amplitude (torsional angle) $\Theta_3$ of the driven member 16, the relation of $T_0 = k_{eq} \cdot (\Theta_1 - \Theta_3)$ holds. Furthermore, when the identity of Formula (16) is solved for the vibration amplitudes (torsional angles) $\Theta_1$ and $\Theta_3$, "$\Theta_1 - \Theta_3$" is represented by Formula (17) below. Thus, from $T_0 = k_{eq} \cdot (\Theta_1 - \Theta_3)$ and Formula (17), the equivalent stiffness $k_{eq}$ of the damper device 10 is represented by Formula (18) below.

$$\Theta_1 - \Theta_3 = \frac{\{k_5 \cdot (k_1+k_2+k_3+k_4) + (k_1+k_2)(k_3+k_4)\}T_0}{k_5(k_1+k_3)(k_2+k_4) + (k_1k_2k_3 + k_1k_2k_4 + k_1k_3k_4 + k_2k_3k_4)} \quad (17)$$

$$K_{eq} = \frac{k_5(k_1+k_3)(k_2+k_4) + (k_1k_2k_3 + k_1k_3k_4 + k_1k_2k_4 + k_2k_3k_4)}{k_5(k_1+k_2+k_3+k_4) + (k_1+k_2)(k_3+k_4)} \quad (18)$$

FIGS. 8 to 13 show the results of the analyses conducted by the inventors on the natural frequency $f_{21}$ on the low rotational-speed side, the frequency fa at the antiresonance point A, and the equivalent stiffness $k_{eq}$ in the damper device 10 that are obtained in a manner described above. FIGS. 8 to 13 each show how the natural frequency $f_{21}$, the frequency fa at the antiresonance point A, and the equivalent stiffness $k_{eq}$ change, when only one parameter out of the combined spring constants $k_1$, $k_2$, $k_3$, $k_4$, and $k_5$ and the moment of inertia $J_{21}$ of the first intermediate member 12 and the moment of inertia $J_{22}$ of the second intermediate member 14 is changed with the other parameters being kept at the respective constant values (fixed values).

Figure 8:
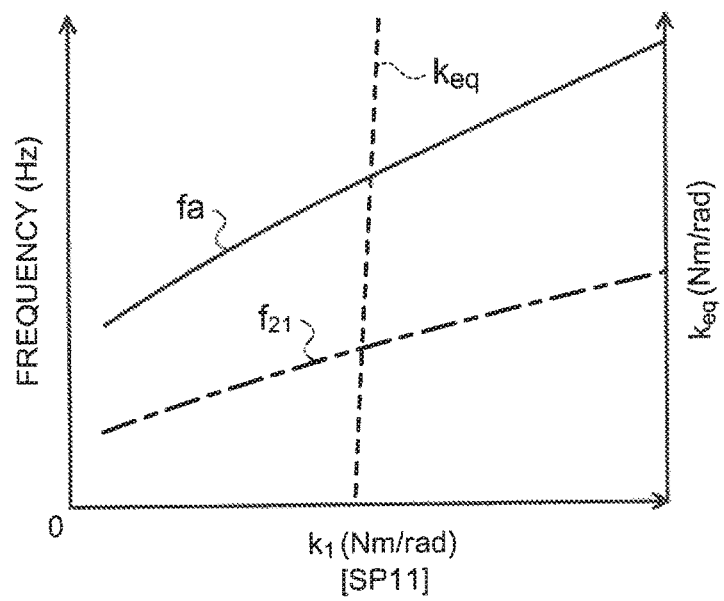
FIG. 8 is an explanatory graph illustrating relations of the natural frequency on a low rotational-speed side, the frequency at an antiresonance point, and the equivalent stiffness of the damper device with respect to the stiffness of a first elastic body in the damper device of the present disclosure.

When only the combined spring constant (stiffness) $k_1$ of the first outer springs (first elastic body) SP11 is changed with the combined spring constants $k_2$, $k_3$, $k_4$, and $k_5$ and the moments of inertia $J_{21}$ and $J_{22}$ in the damper device 10 being kept at the respective constant values, the natural frequency $f_{21}$ and the frequency fa at the antiresonance point A increase as the combined spring constant $k_1$ increases, and gradually decrease as the combined spring constant $k_1$ decreases as shown in FIG. 8. In contrast, the equivalent stiffness $k_{eq}$ sharply increases when the combined spring constant $k_1$ is increased slightly from a value adapted in advance, and sharply decreases when the combined spring constant $k_1$ is decreased slightly from the adapted value as depicted in FIG. 8. In other words, the change (change gradient) in the equivalent stiffness $k_{eq}$ with respect to the change in the combined spring constant $k_1$ of the first outer springs SP11 is significantly large.

Figure 9:
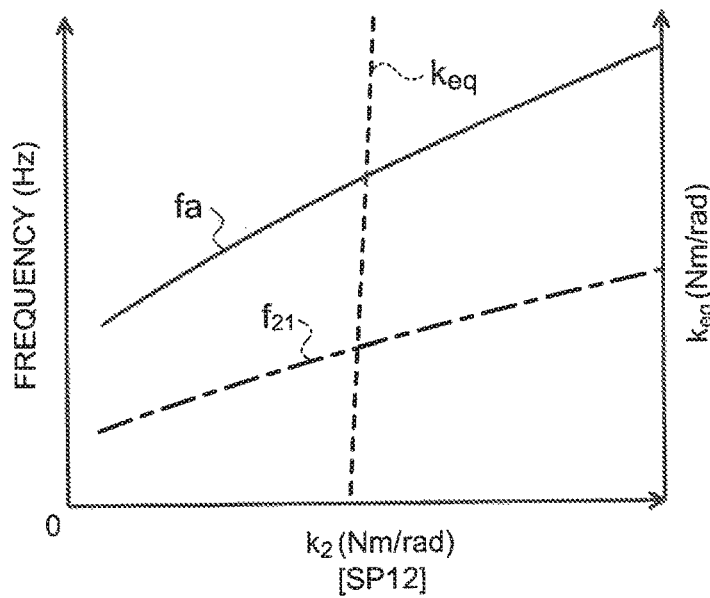
FIG. 9 is an explanatory graph illustrating relations of the natural frequency on the low rotational-speed side, the frequency at the antiresonance point, and the equivalent stiffness of the damper device with respect to the stiffness of a second elastic body in the damper device of the present disclosure.

When only the combined spring constant (stiffness) $k_2$ of the second outer springs (second elastic body) SP12 is changed with the combined spring constants $k_1$, $k_3$, $k_4$, and $k_5$ and the moments of inertia $J_{21}$ and $J_{22}$ in the damper device 10 being kept at the respective constant values, the natural frequency $f_{21}$ and the frequency fa at the antiresonance point A increase as the combined spring constant $k_2$ increases, and gradually decreases as the combined spring constant $k_2$ decreases as shown in FIG. 9. Furthermore, the equivalent stiffness $k_{eq}$ sharply increases when the combined spring constant $k_2$ is increased slightly from a value adapted in advance, and sharply decreases when the combined spring constant $k_2$ is decreased slightly from the adapted value as shown in FIG. 9. In other words, the change (change gradient) in the equivalent stiffness $k_{eq}$ with respect to the change in the combined spring constant $k_2$ of the second outer springs SP12 is also significantly large.

Figure 10:
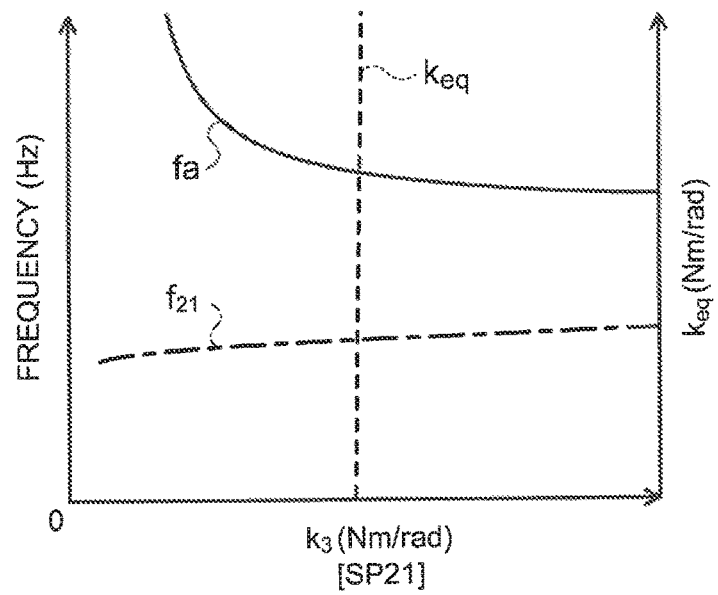
FIG. 10 is an explanatory graph illustrating relations of the natural frequency on the low rotational-speed side, the frequency at the antiresonance point, and the equivalent stiffness of the damper device with respect to the stiffness of a third elastic body in the damper device of the present disclosure.

When only the combined spring constant (stiffness) $k_3$ of the first inner springs (third elastic body) SP21 is changed with the combined spring constants $k_1$, $k_2$, $k_4$, and $k_5$ and the moments of inertia $J_{21}$ and $J_{22}$ in the damper device 10 being kept at the respective constant values, the natural frequency $f_{21}$ slightly increases (is maintained substantially constant) as the combined spring constant $k_3$ increases, and the frequency fa at the antiresonance point A increases as the combined spring constant $k_3$ decreases, and gradually decreases as the combined spring constant $k_3$ increases as shown in FIG. 10. The equivalent stiffness $k_{eq}$ sharply decreases when the combined spring constant $k_3$ is decreased slightly from a value adapted in advance, and sharply increases when the combined spring constant $k_3$ is increased slightly from the adapted value as shown in FIG. 10. In other words, the change (change gradient) in the equivalent stiffness $k_{eq}$ with respect to the change in the combined spring constant $k_3$ of the first inner springs SP21 is also significantly large.

Figure 11:
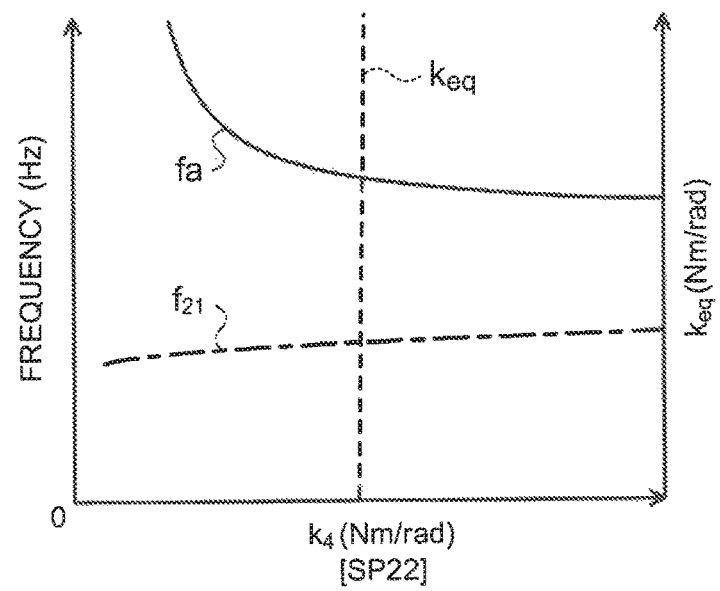
FIG. 11 is an explanatory graph illustrating relations of the natural frequency on the low rotational-speed side, the frequency at the antiresonance point, and the equivalent stiffness of the damper device with respect to the stiffness of a fourth elastic body in the damper device of the present disclosure.

Furthermore, also when only the combined spring constant (stiffness) $k_4$ of the second inner springs (fourth elastic body) SP22 is changed with the combined spring constants $k_1$, $k_2$, $k_3$, and $k_5$ and the moments of inertia $J_{21}$ and $J_{22}$ in the damper device 10 being kept at the respective constant values, the natural frequency $f_{21}$ slightly increases (is maintained substantially constant) as the combined spring constant $k_4$ increases, and the frequency fa at the antiresonance point A increases as the combined spring constant $k_4$ decreases, and gradually decreases as the combined spring constant $k_4$ increases as shown in FIG. 11. The equivalent stiffness $k_{eq}$ sharply decreases when the combined spring constant $k_4$ is decreased slightly from a value adapted in advance, and sharply increases when the combined spring constant $k_4$ is increased slightly from the adapted value as shown in FIG. 11. In other words, the change (change gradient) in the equivalent stiffness $k_{eq}$ with respect to the change in the combined spring constant $k_4$ of the second inner springs SP22 is also significantly large.

Figure 12:
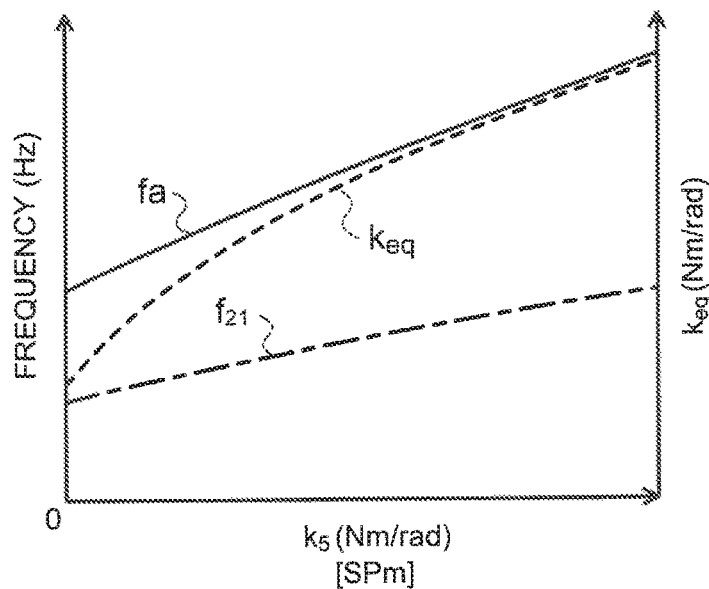
FIG. 12 is an explanatory graph illustrating relations of the natural frequency on the low rotational-speed side, the frequency at the antiresonance point, and the equivalent stiffness of the damper device with respect to the stiffness of a fifth elastic body in the damper device of the present disclosure.

When only the combined spring constant (stiffness) $k_5$ of the intermediate springs (fifth elastic body) SPm is changed with the combined spring constants $k_1$, $k_2$, $k_3$, and $k_4$ and the moments of inertia $J_{21}$ and $J_{22}$ in the damper device 10 being kept at the respective constant values, the natural frequency $f_{21}$ and the frequency fa at the antiresonance point A increase as the combined spring constant $k_5$ increases, and gradually decrease as the combined spring constant $k_5$ decreases as shown in FIG. 12. The difference (fa–$f_{21}$) between the natural frequency $f_{21}$ and the frequency fa at the antiresonance point A corresponding to a certain combined spring constant $k_5$ gradually increase as the combined spring constant $k_5$ increases as shown in FIG. 12. Furthermore, when only the combined spring constant $k_5$ of the intermediate springs SPm is changed, the equivalent stiffness $k_{eq}$ increases as the combined spring constant $k_5$ increases, and gradually decreases as the combined spring constant $k_5$ decreases as shown in FIG. 12. In other words, the change (change gradient) in the equivalent stiffness $k_{eq}$ with respect to the change in the combined spring constant (stiffness) $k_5$ of the intermediate springs SPm is much smaller than the changes (change gradients) in the equivalent stiffness $k_{eq}$ with respect to the changes in the combined spring constants (stiffnesses) $k_1$, $k_2$, $k_3$, and $k_4$.

Figure 13:
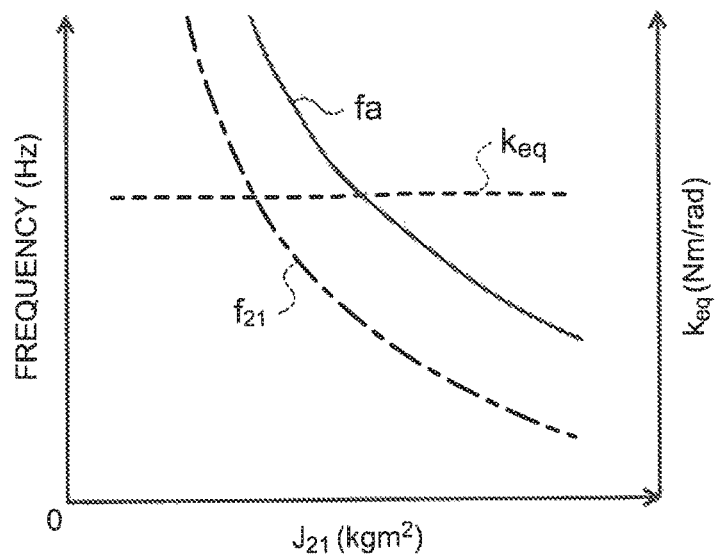
FIG. 13 is an explanatory graph illustrating relations of the natural frequency on the low rotational-speed side, the frequency at the antiresonance point, and the equivalent stiffness of the damper device with respect to the moment of inertia of a first intermediate element in the damper device of the present disclosure.

When only the moment of inertia $J_{21}$ of the first intermediate member 12 is changed with the combined spring constants $k_1$, $k_2$, $k_3$, $k_4$, and $k_5$ and the moment of inertia $J_{22}$ of the second intermediate member 14 in the damper device 10 being kept at the respective constant values, the natural frequency $f_{21}$ and the frequency fa at the antiresonance point A increase as the moment of inertia $J_{21}$ decreases, and gradually decrease as the moment of inertia $J_{21}$ increases as shown in FIG. 13. Furthermore, even when only the moment of inertia $J_{21}$ of the first intermediate member 12 is changed, the equivalent stiffness $k_{eq}$ is maintained substantially constant as shown in FIG. 13. Although not shown in the drawings, also when only the moment of inertia $J_{22}$ of the second intermediate member 14 is changed with the combined spring constants $k_1$, $k_2$, $k_3$, $k_4$, and $k_5$ and the moment of inertia $J_{21}$ of the first intermediate member 12 in the damper device 10 being kept at the respective constant values, the same result is obtained as in the case where only the moment of inertia $J_{21}$ of the first intermediate member 12 is changed.

As can be seen from the analysis results described above, reducing the stiffness of the intermediate springs SPm (reducing the spring constant $k_m$ and the combined spring constant $K_5$) can reduce the natural frequency $f_{21}$ on the low rotational-speed side (see Formula (13)) and the frequency fa at the antiresonance point A (see Formula (6)). Conversely, increasing the stiffness of the intermediate springs SPm (increasing the spring constant $k_m$ and the combined spring constant $K_5$) can increase the difference (fa-$f_{21}$) between the natural frequency $f_{21}$ on the low rotational-speed side and the frequency fa at the antiresonance point A. Furthermore, even when the stiffness of the intermediate springs SPm is reduced (even when the spring constant $k_m$ and the combined spring constant $K_5$ are set to smaller values), the equivalent stiffness $k_{eq}$ does not significantly decrease. Thus, in the damper device 10, by adjusting the stiffness of the intermediate springs SPm (the spring constant $k_m$ and the combined spring constant $K_5$), it is possible to suitably set the natural frequency $f_{21}$ on the low rotational-speed side and the frequency fa at the antiresonance point A while suitably maintaining the equivalent stiffness $k_{eq}$ in accordance with the maximum input torque to the drive member 11 and preventing the weights of the first and second intermediate members 12 and 14, that is, the moments of inertia $J_{21}$ and $J_{22}$, from increasing. In addition, by reducing the stiffnesses of the first and second outer springs SP11 and SP12 (decreasing the spring constants $k_{11}$ and $k_{12}$ and the combined spring constants $K_1$ and $K_2$), the natural frequency $f_{21}$ on the low rotational-speed side and the frequency fa at the antiresonance point A can be reduced. Furthermore, by increasing the stiffnesses of the first and second inner springs SP21 and SP22 (increasing the spring constants $k_{21}$ and $k_{22}$ and the combined spring constants $K_3$ and $K_4$), the frequency fa at the antiresonance point A can be reduced.

In a vehicle carrying the engine (internal combustion engine) EG as a power generating source for travelling, lowering the lockup rotational speed Nlup to mechanically transmit torque from the engine EG to the transmission TM earlier can improve the efficiency of power transfer between the engine EG and the transmission TM, thereby improving the fuel efficiency of the engine EG. However, in a low rotational-speed range of about 500 rpm to 1500 rpm that can be a range within which the lockup rotational speed Nlup is set, vibrations transmitted from the engine EG to the drive member 11 via the lockup clutch become larger, so that increase in vibration level is significant especially in a vehicle carrying an engine having fewer cylinders such as a three-cylinder or four-cylinder engine. Thus, in order to prevent such large vibrations from being transmitted to the transmission TM, for example, when lockup is performed or immediately after lockup has been started, it is necessary to reduce the vibration level in a rotational-speed range near the lockup rotational speed Nlup of the entire damper device 10 (driven member 16) that transmits torque (vibrations) from the engine EG to the transmission TM while lockup is being performed.

In view of this, the inventors have structured the damper device 10 such that, based on the lockup rotational speed Nlup determined for the lockup clutch 8, the antiresonance point A is formed when the rotational speed of the engine EG is within a range of 500 rpm to 1500 rpm (expected range within which the lockup rotational speed Nlup is set). The rotational speed Nea of the engine EG corresponding to the frequency fa at the antiresonance point A is expressed as Nea=(120/n)·fa, where "n" is the number of cylinders of the engine (internal combustion engine) EG. Thus, in the damper device 10, the combined spring constant $k_1$ of the first outer springs SP11, the combined spring constant $k_2$ of the second outer springs SP12, the combined spring constant $k_3$ of the first inner springs SP21, the combined spring constant $k_4$ of the second inner springs SP22, the combined spring constant $k_5$ of the intermediate springs SPm, the moment of inertia $J_{21}$ of the first intermediate member 12 (in which the moment of inertia of the turbine runner 5, for example, that is coupled so as to rotate integrally therewith is considered (added), the same applies hereinafter), and the moment of inertia $J_{22}$ of the second intermediate member 14 are selected and set so as to satisfy Formula (19) below. In other words, in the damper device 10, based on the frequency fa at the antiresonance point A (and the lockup rotational speed Nlup), the spring constants $k_{11}$, $k_{12}$, $k_{21}$, $k_{22}$, and $k_m$ of the springs SP11 to SPm and the moments of inertia $J_{21}$ and $J_{22}$ of the first and second intermediate members 12 and 14 are selected and set.

$$500 \text{ rpm} \leq \frac{120}{n} fa \leq 1500 \text{ rpm} \tag{19}$$

In this manner, by setting the antiresonance point A at which the vibration amplitude $\Theta_3$ of the driven member 16 can be theoretically reduced to zero (vibrations can be further lowered) within the low rotational-speed range (expected range within which the lockup rotational speed Nlup is set) of 500 rpm to 1500 rpm, as depicted in FIG. 7, the resonance that generates the antiresonance point A (resonance that has to be generated so as to form the antiresonance point A, the resonance of the first intermediate member 12 in the present embodiment, see the resonance point R1 in FIG. 7) can be shifted toward the lower rotational-speed side (lower frequency side) so as to be included in the non-lockup region (see the dashed and double-dotted line in FIG. 7) of the lockup clutch 8. In other words, in the present embodiment, the resonance of the first intermediate member 12 (resonance at the lower natural frequency of the two natural frequencies) is a theoretical one that does not occur within a rotational-speed range in which the damper device 10 is used. As depicted in FIG. 7, the rotational speed corresponding to the lower natural frequency (the natural frequency of the first intermediate member 12) of the two natural frequencies of the damper device 10 is lower than the lockup rotational speed Nlup of the lockup clutch 8, and the rotational speed corresponding to the higher natural frequency (the natural frequency of the second intermediate member 14) of the two natural frequencies of the damper device 10 is higher than the lockup rotational speed Nlup. Accordingly, from the time when lockup is performed by the lockup clutch 8, one of a set of vibrations transmitted from the second outer springs SP12 to the driven member 16 and a set of vibrations transmitted from the second inner springs SP22 to the driven member 16 can cancel at least part of the other set of vibrations.

When the damper device 10 is structured so as to satisfy Formula (19), the spring constants $k_{11}$, $k_{12}$, $k_{21}$, $k_{22}$, and $k_m$ and the moments of inertia $J_{21}$ and $J_{22}$ are preferably selected and set so that the frequency of the resonance (see the resonance point R1 in FIG. 7) that generates the antiresonance point A is a value that is lower than the frequency fa at the antiresonance point A and is as low as possible. For this reason, in the damper device 10 of the present embodiment, values for the spring constant $k_{11}$, $k_{12}$, $k_{21}$, $k_{22}$, and $k_m$ are determined so as to satisfy the relation of $k_{11} < k_m < k_{12} < k_{22} < k_{21}$.

Specifically, in the damper device 10, the spring constant $k_m$ of the intermediate springs SPm and the spring constants $k_{11}$ and $k_{12}$ of the first and second outer springs SP11 and SP12 are determined to be small so that the natural frequency $f_{21}$ on the low rotational-speed side and the frequency fa at the antiresonance point A become lower. Furthermore, the spring constants $k_{21}$ and $k_{22}$ of the first and second inner springs SP21 and 22 are determined to be large so that the natural frequency $f_{21}$ on the low rotational-speed side becomes lower. This enables the natural frequency $f_{21}$ on the low rotational-speed side and the frequency fa at the antiresonance point A to become lower. Thus, the starting point of a rotational-speed band (frequency band) in which one of a set of vibrations transmitted from the second outer springs SP12 to the driven member 16 and a set of vibrations transmitted from the second inner springs SP22 to the driven member 16 cancels at least part of the other set of vibrations can be set on the lower rotational-speed side (lower frequency side). Furthermore, by setting this starting point of the rotational-speed band on the lower rotational-speed side, the rotational speed (frequency) at which the phase of vibrations transmitted from the second outer springs SP12 to the driven member 16 and the phase of vibrations transmitted from the second inner springs SP22 to the driven member 16 are shifted 180° from each other can also be set on the lower rotational-speed side. Consequently, lockup can be allowed at a further lower rotational speed, and also the vibration damping performance in the low rotational-speed range can be further improved.

In the damper device 10, as depicted in FIG. 7, after a damping peak of vibrations of the driven member 16 occurs near the antiresonance point A, as the rotational speed of the engine EG becomes higher, resonance (resonance of the second intermediate member 14 in the present embodiment, see the resonance point R2 in FIG. 7) occurs at the higher natural frequency of the two natural frequencies, and accordingly the vibrations transmitted from the second outer springs SP12 to the driven member 16 and the vibrations transmitted from the second inner springs SP22 to the driven member 16 come into the same phase. In other words, in the damper device 10 of the present embodiment, during a period from the occurrence of the resonance (resonance of the first intermediate member 12) at the lower natural frequency of the two natural frequencies until the occurrence of the resonance (resonance of the second intermediate member 14) at the higher natural frequency of the two natural frequencies, one of a set of the vibrations transmitted from the second outer springs SP12 to the driven member 16 and a set of the vibrations transmitted from the second inner springs SP22 to the driven member 16 cancels at least part of the other set of vibrations. Thus, the spring constants (combined spring constants) $k_1$, $k_2$, $k_3$, $k_4$, and $k_5$ and the moments of inertia $J_{21}$ and $J_{22}$ are preferably selected and set so that the frequency of resonance that occurs on the higher rotational-speed side (higher frequency side) of the antiresonance point A becomes higher. This enables the resonance (at the resonance point R2) to occur on the high rotational-speed range side on which vibrations are less likely to become apparent, and thus the vibration damping performance of the damper device 10 in the low rotational-speed range can be further improved.

Furthermore, in order to further improve the vibration damping performance near the lockup rotational speed Nlup in the damper device 10, it is necessary to separate the lockup rotational speed Nlup as apart as possible from the rotational speed of the engine EG corresponding to the resonance point R2. Thus, when the damper device 10 is structured so as to satisfy Formula (19), the spring constants $k_1$, $k_2$, $k_3$, $k_4$, and $k_5$ and the moments of inertia $J_{21}$ and $J_{22}$ are preferably selected and set so as to satisfy Nlup≤(120/n)·fa(=Nea). This enables the lockup clutch 8 to perform lockup while satisfactorily preventing vibrations from being transmitted to the input shaft IS of the transmission TM, and also enables the damper device 10 to excellently damp vibrations from the engine EG immediately after starting the lockup.

As described above, by designing the damper device 10 based on the frequency fa at the antiresonance point A, the vibration damping performance of the damper device 10 can be significantly improved. The research and analyses conducted by the inventors have confirmed that, when the lockup rotational speed Nlup is determined to be a value around 1000 rpm, for example, by structuring the damper device 10 such that 900 rpm≤(120/n)·fa≤1200 rpm is satisfied, for example, very satisfactorily results for practical use can be obtained.

As can be understood from Formulae (13) and (14), the two natural frequencies $f_{21}$ and $f_{22}$ of the damper device 10 are affected by both of the moments of inertia $J_{21}$ and $J_{22}$ of the first and second intermediate members 12 and 14.

Specifically, in the damper device 10, because the first intermediate member 12 and the second intermediate member 14 are coupled to each other via the intermediate springs SPm, force from the intermediate springs SPm acts on both of the first and second intermediate members 12 and 14 (see the hollow arrows in FIG. 6), so that vibrations of the first intermediate member 12 and vibrations of the second intermediate member 14 are coupled (both sets of vibrations affect each other). The vibrations of the first intermediate member 12 and the vibrations of the second intermediate member 14 are coupled in this manner, so that the natural frequencies $f_{21}$ and $f_{22}$ are affected by both of the moments of inertia $J_{21}$ and $J_{22}$ of the first and second intermediate members 12 and 14. Thus, in the damper device 10, it is possible to prevent the weights of the first and second intermediate members 12 and 14, i.e., the moments of inertia $J_{21}$ and $J_{22}$, from increasing and to set the natural frequencies $f_{21}$ and $f_{22}$ and the frequency fa at the antiresonance point A, so that resonance at the lower natural frequency of the two natural frequencies $f_{21}$ and $f_{22}$ can be easily shifted to the low rotational-speed side, i.e., into the non-lockup region, and accordingly cancellation of vibrations in the driven member 16 more satisfactorily occurs at a lower rotational speed of the drive member 11.

Furthermore, in the damper device 10, because the two natural frequencies $f_{21}$ and $f_{22}$ are affected by both of the moments of inertia $J_{21}$ and $J_{22}$ of the first and second intermediate members 12 and 14, adjusting the moments of inertia $J_{21}$ and $J_{22}$ of the first and second intermediate members 12 and 14, as depicted in FIG. 7, allows the frequency fa at the antiresonance point A to be a value substantially equivalent to the frequency fa' at the antiresonance point of the damper device of the comparative example, and also allows the natural frequency $f_{21}$ (at the resonance point R1) on the low rotational-speed side to be easily shifted to a lower rotational-speed side in the non-lockup region as compared to the damper device of the comparative example. This enables the damper device 10 to reduce the vibration level near the antiresonance point A as compared to the damper device (see the dashed line in FIG. 7) of the comparative example. In this manner, by reducing the natural frequency $f_{21}$ on the low rotational-speed side to reduce the vibration level near the antiresonance point A, the lockup rotational speed Nlup can be maintained to be lower even if the order of vibrations from an engine EG having a function of deactivating cylinders decreases when the engine EG starts operation with a reduced number of cylinders.

The analyses conducted by the inventors have revealed that coupling the first and second intermediate members 12 and 14 to each other with the intermediate springs SPm to couple vibrations of both members facilitates mutual cancellation of vibrations transmitted to the driven member 16 through the first, second, and third torque transfer paths P1, P2, and P3, so that the actual vibration amplitude of the driven member 16 near the antiresonance point A can be further reduced, and the difference in torque amplitude (torque fluctuations) between the second outer springs SP12 and the second inner springs SP22 can be reduced (torque amplitudes of both springs can be made closer to each other). Thus, in the damper device 10, lockup (coupling between the engine EG and the drive member 11) at a lower rotational speed can be allowed, and also the vibration damping performance in the low rotational-speed range in which vibrations from the engine EG tend to become large can be further improved.

Herein, if $k_5=0$ in Formula (13), the natural frequency $f_{21}'$ of the first intermediate member in the damper device of the comparative example in which the intermediate springs SPm are omitted is represented by Formula (20) below, and if $k_5=0$ in Formula (14), the natural frequency $f_{22}'$ of the second intermediate member in the damper device of the comparative example is represented by Formula (21) below. As can be understood from Formulae (20) and (21), in the damper device of the comparative example, the natural frequency $f_{21}'$ of the first intermediate member is not affected by the moment of inertia $J_{22}$ of the second intermediate member, and the natural frequency $f_{22}'$ of the second intermediate member is not affected by the moment of inertia $J_{21}$ of the first intermediate member. From this point, it can be understood that, in the damper device 10, as compared to the damper device of the comparative example, flexibility in setting the natural frequencies $f_{21}$ and $f_{22}$ of the first and second intermediate members 12 and 14 can be increased.

$$f_{21}' = \frac{1}{2\pi}\sqrt{\frac{k_1+k_2}{J_{21}}} \qquad (20)$$

$$f_{22}' = \frac{1}{2\pi}\sqrt{\frac{k_3+k_4}{J_{22}}} \qquad (21)$$

If $k_5=0$ in Formula (6), the frequency fa' at the antiresonance point in the damper device of the comparative example is represented by Formula (22) below. Comparison between Formula (6) and Formula (22) indicates that when the spring constants $k_1$, $k_2$, $k_3$, and $k_4$ and the moments of inertia $J_{21}$ and $J_{22}$ are the same in both Formulae, the frequency fa' at the antiresonance point in the damper device of the comparative example is smaller than the frequency fa at the antiresonance point A in the damper device 10. However, in the damper device 10, mainly by suitably selecting the moments of inertia $J_{21}$ and $J_{22}$ of the first and second intermediate members 12 and 14, the frequency fa at the antiresonance point A can be easily set to a value substantially equivalent to the frequency fa' at the antiresonance point in the damper device of the comparative example (see the dashed line in FIG. 7).

$$fa' = \frac{1}{2\pi}\sqrt{\frac{k_1k_2k_3+k_1k_2k_4+k_1k_3k_4+k_2k_3k_4}{J_{21}k_3k_4+J_{22}k_1k_2}} \qquad (22)$$

Furthermore, in the damper device 10 of the present embodiment, the first intermediate member 12 is structured such that the moment of inertia $J_{21}$ is larger than the moment of inertia $J_2$ of the second intermediate member 14, and is further coupled to the turbine runner 5 so as to rotate integrally therewith. This makes it possible to further reduce the natural frequency $f_{22}$ on the low frequency side to further reduce the vibration level near the antiresonance point A. When the first intermediate member 12 is coupled to the turbine runner 5 so as to rotate integrally therewith, the substantial moment of inertia $J_{21}$ (sum of the moments of inertia of the first intermediate member 12 and the turbine runner 5, for example) of the first intermediate member 12 can be increased. This makes it possible to further reduce the natural frequency $f_{21}$ on the low frequency side to set the resonance point of the first intermediate member 12 on the lower rotational-speed side (lower frequency side).

Although a basic design procedure for the damper device 10 on the assumption that hysteresis does not exist has been described above, as a matter of fact, it is extremely difficult to eliminate hysteresis in the damper device 10 including the springs SP11, SP12, SP21, SP22, and SPm. In the damper device 10 including the first and second torque transfer paths P1 and P2, the frequency at which the phase of vibrations transmitted from the second outer springs SP12 to the driven member 16 shifts 180° with respect to the phase of vibrations transmitted from the second inner springs SP22 to the driven member 16 would shift from a theoretical value toward the high frequency side (high rotational-speed side) due to hysteresis. If such a shift of phase reversal toward the high frequency side occurs, the frequency at which the vibration amplitude of the driven member 16 becomes minimum due to mutual cancellation between vibrations from the second outer springs SP12 and vibrations from the second inner springs SP22 also shifts toward the high frequency side (high rotational-speed side). In view of this, the inventors examined the influence of hysteresis on the phase reversal of vibrations due to resonance at the natural frequency on the low frequency side in the damper device 10 and in the damper device of the comparative example.

Figure 14:
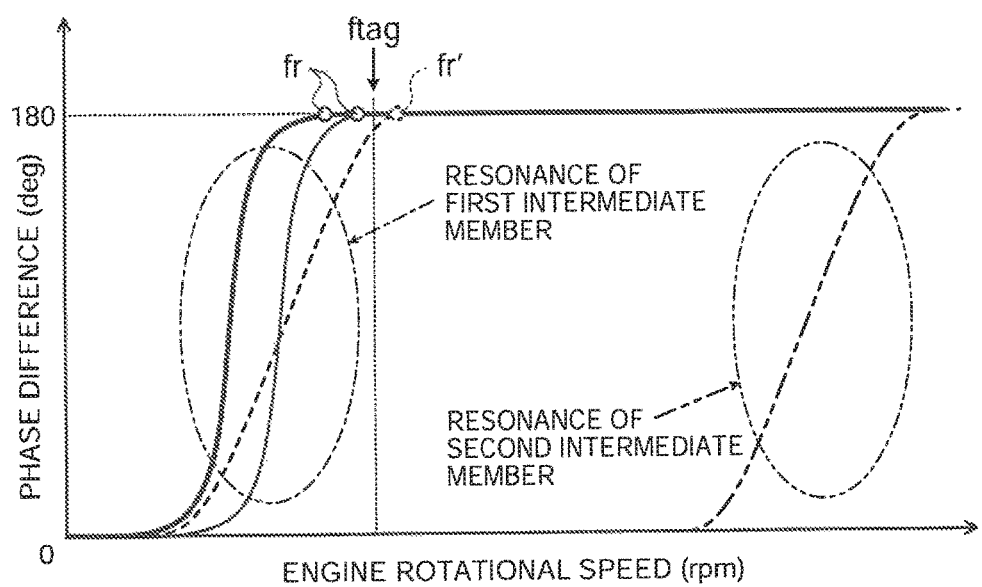
FIG. 14 is an explanatory graph illustrating a relation between the rotational speed of the engine and the phase difference between vibrations transmitted from the second elastic body to the output element and vibrations transmitted from the fourth elastic body to the output element.

To begin with, the inventors performed a simulation on a model of the damper device of the comparative example in which the frequency fa' (see Formula (22)) at the theoretical antiresonance point is substantially matched to the frequency flag of resonance due to vibrations of the entire damper device and the drive shaft of the vehicle (resonance due to vibrations generated between the drive member and the drive shaft), and verified the phase change of vibrations due to resonance at the natural frequency $f_{21}'$ on the low frequency side. FIG. 14 illustrates a simulation result on the damper device of the comparative example indicated by a dashed line. As depicted in FIG. 14, in the damper device of the comparative example, it was found that the frequency fr' at which the phases of vibrations in two torque transfer paths are shifted 180° from each other shifts toward the higher frequency side (higher rotational-speed side) of the frequency flag (engine rotational speed corresponding thereto) of vibrations to be damped, as indicated by the dashed line in the drawing. Thus, it is considered that the damper device of the comparative example cannot satisfactorily damp the resonance due to vibrations of the entire damper device and the drive shaft of the vehicle.

Furthermore, the inventors performed a simulation on a model of the damper device 10 in which the frequency fa (see Formula (6)) at the theoretical antiresonance point A is substantially matched to the frequency flag (the same value as in the case of the comparative example) of resonance due to vibrations of the entire damper device 10 and the drive shaft of the vehicle, and verified the phase change of vibrations due to resonance at the natural frequency $f_{21}$ on the low frequency side in the damper device 10. FIG. 14 illustrates a simulation result on the damper device 10 indicated by a solid line. As can be seen from the simulation results in FIG. 14, in the damper device 10 structured as described above, the influence of hysteresis on the phase reversal of vibrations due to resonance at the natural frequency $f_{21}$ on the low frequency side can be satisfactorily reduced in comparison with the damper device of the comparative example.

In other words, in the damper device 10 including the intermediate springs SPm, as described above, by adjusting the moments of inertia $J_2$ and $J_{22}$ of the first and second intermediate members 12 and 14, resonance at the natural frequency $f_{21}$ on the low frequency side, i.e., resonance of the first intermediate member 12, can be easily shifted toward a lower frequency side. In the damper device 10, the spring constants $k_{11}$, $k_{12}$, $k_{21}$, and $k_{22}$ of the first and second outer springs SP11 and SP12 and the first and second inner springs SP21 and SP22 satisfy the relations of $k_{11} < k_{21}$ and $k_{11}/k_{21} \# k_{12}/k_{22}$. This enables torque (part of the average torque) to be transmitted from the second intermediate member 14 to the first intermediate member 12 through the third torque transfer path P3 including the intermediate springs SPm, so that the torque sharing of the first outer springs SP11 can be reduced to reduce the spring constant $k_{11}$ (reduce the stiffness), and the friction force generated between the first outer springs SP11 and rotating elements can be reduced by weight reduction of the first outer springs SP11 associated with the reduced stiffness. Thus, hysteresis of the first outer springs SP11 can be reduced and, as indicated by the thin solid line in FIG. 14, the phase reversal of vibrations (vibrations in the first torque transfer path P1) transmitted from the second outer springs SP12 to the driven member 16 due to resonance at the natural frequency $f_{21}$, i.e., resonance of the first intermediate member 12, can be quickly completed (the slope of the phase change can be steeply inclined). Consequently, in the damper device 10, the influence of hysteresis on the phase reversal can be reduced and, as indicated by the solid line in FIG. 14, the frequency fr at which the phase of vibrations transmitted from the second outer springs SP12 to the driven member 16 shifts 180° with respect to the phase of vibrations transmitted from the second inner springs SP22 to the driven member 16 can be shifted toward a lower frequency side (lower rotational-speed side) of the frequency flag of vibrations to be damped.

Furthermore, in the damper device 10, the spring constants $k_{11}$, $k_{12}$, $k_{21}$, and $k_{22}$ of the first and second outer springs SP11 and SP12 and the first and second inner springs SP21 and SP22 satisfy the relations of $k_{11}/k_{21} < k_{12}/k_{22}$ and $k_{11} < k_{12} < k_{22} < k_{21}$. When these relations hold, torque (part of the average torque) is transmitted from the second intermediate member 14 to the first intermediate member 12 through the third torque transfer path P3 including the intermediate springs SPm, and torque transmitted by the second outer springs SP12 between the first intermediate member 12 and the driven member 16 increases. Theoretically, the input torque T (sum of torque transmitted by the first outer springs SP11 and torque transmitted by the first inner springs SP21) to the drive member 11 is equal to the sum of torque transmitted by the second outer springs SP12 and torque transmitted by the second inner springs SP22. Thus, when the relations of $k_{11}/k_{21} < k_{12}/k_{22}$ and $k_{11} < k_{12} < k_{22} < k_{21}$ are satisfied, by reducing the torque sharing of the first outer springs SP11, the spring constant $k_{11}$ of the first outer springs SP11 can be reduced (the stiffness can be reduced) and, furthermore, the spring constant $k_{12}$ of the second outer springs SP12 can also be reduced (the stiffness can be reduced). Thus, in the damper device 10, the friction force generated between the first and second outer springs SP11 and SP12 and rotating elements, i.e., hysteresis, can be reduced by weight reduction of these springs associated with the reduced stiffness, and also resonance at the natural frequency $f_{21}$, i.e., resonance of the first intermediate member 12, can be shifted toward a lower frequency side. Consequently, as indicated by the thick solid line in FIG. 14, the shift of the frequency fr toward the high frequency side caused by the hysteresis can be more satisfactorily reduced.

In the damper device 10, the first and second outer springs SP11 and SP12 are disposed so as to be aligned along the circumferential direction of the damper device 10, and the first and second inner springs SP21 and SP22 are disposed radially inward of the first and second outer springs SP11 and SP12 so as to be aligned along this circumferential direction. Thus, it is possible to reduce the stiffnesses of the first outer springs SP11 and the second outer springs SP12 on the outer peripheral side while further shortening the axial length of the damper device 10, so that hysteresis of both springs can be reduced, and it is also possible to reduce centrifugal force that acts on the first and second inner springs SP21 and SP22 on the inner peripheral side, so that hysteresis of both springs can be reduced. Thus, in the damper device 10, hysteresis of the entire device can be satisfactorily reduced.

Figure 15:
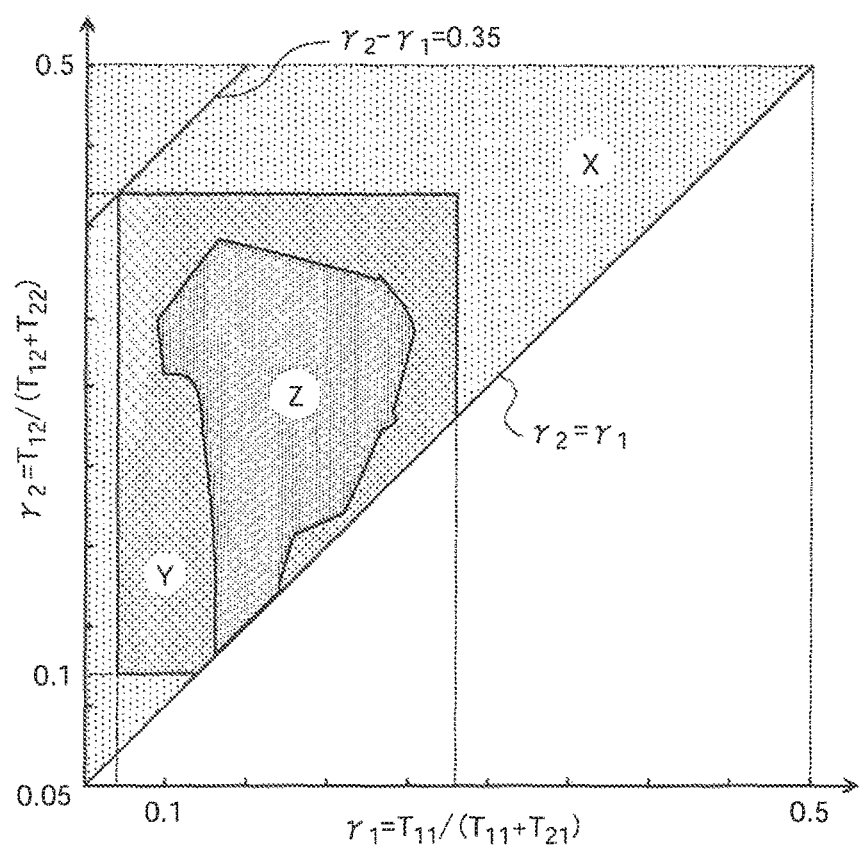
FIG. 15 is an explanatory graph illustrating a relation among torque sharing rates of elastic bodies and the vibration damping performance in the damper device of the present disclosure.

FIG. 15 is an explanatory graph illustrating a relation among the torque sharing rate $\gamma_1$ of the first outer springs SP11 and the first inner springs SP21 to each of which torque is transmitted from the drive member 11, the torque sharing rate $\gamma_2$ of the second outer springs SP12 and the second inner springs SP22 each of which transmits torque to the driven member 16, and the vibration damping performance of the damper device 10. The inventors also conducted an analysis on the relation among the torque sharing rates $\gamma_1$ and $\gamma_2$ and the vibration damping performance of the damper device 10 when the input torque T to the drive member 11 is a predetermined value smaller than the torque T1 (when deformation is allowed in all of the springs SP11, SP12, SP21, SP22, and SPm). When torque transmitted by the first outer springs SP11 from the drive member 11 to the first intermediate member 12 is "$T_{11}$" and torque transmitted by the first inner springs SP21 from the drive member 11 to the second intermediate member 14 is "$T_{21}$", the torque sharing rate $\gamma_1$ is expressed as $\gamma_1 = T_{11}/(T_{11}+T_{21})$. When torque transmitted by the second outer springs SP12 from the first intermediate member 12 to the driven member 16 is "$T_{12}$" and torque transmitted by the second inner springs SP22 from the second intermediate member 14 to the driven member 16 is "$T_{22}$", the torque sharing rate 72 is expressed as $\gamma_2 = T_{12}/(T_{12}+T_{22})$. As described above, among the input torque T and the torques $T_{11}$, $T_{21}$, $T_{12}$, and $T_{22}$, theoretically, the relation of $T = T_{11}+T_{21} = T_{12}+T_{22}$, holds. In this analysis as well, the vibration damping performance of the damper device 10 was evaluated based on the vibration amplitude (torque fluctuations) of the driven member 16 in the same manner as in FIG. 7, for example.

When torque (part of the average torque) is transmitted from the second intermediate member 14 to the first intermediate member 12 through the third torque transfer path P3 including the intermediate springs SPm as in the damper device 10, the torque sharing rates $\gamma_1$ and $\gamma_2$ are included in the area X that lies on the upper side of the line segment representing $\gamma_1 = \gamma_2$ (excluding the line segment representing $\gamma_7 = \gamma_2$) in FIG. 15. This area X is an area in which the relation of $\gamma_1 < \gamma_2$, i.e., $T_{11}/(T_{11}+T_{21}) < T_{12}/(T_{12}+T_{22})$ holds. The inventors determined through analysis a range in the area X in which it is possible to satisfactorily secure the vibration damping performance while preventing the coil diameters or the axial lengths of the springs SP11, SP12, SP21, SP22, and SPm from increasing, i.e., preventing the damper device 10 from increasing in size.

As a result of the analysis, it was found that it is possible to satisfactorily secure the vibration damping performance while preventing the damper device 10 from increasing in size when the torque sharing rates $\gamma_1$ and $\gamma_2$ are included in the area Y indicated in FIG. 15. The area Y is an area in which the relations of $\gamma_1 < \gamma_2$, $0.075 \leq \gamma_1 = T_{11}/(T_{11}+T_{21}) \leq 0.28$, and $0.12 \leq \gamma_2 = T_{12}/(T_{12}+T_{22}) \leq 0.42$ are satisfied. Furthermore, the analysis conducted by the inventors has revealed that the vibration damping performance of the damper device 10 can be further improved when the torque sharing rates $\gamma_1$ and $\gamma_2$ are included in the area Z inside the area Y indicated in FIG. 15. The area Z is an area in which the relations of $\gamma_1 < \gamma_2$, $0.1 \leq \gamma_1 = T_{11}/(T_{11}+T_{21}) \leq 0.25$, and $0.13 \leq \gamma_2 = T_{12}/(T_{12}+T_{22}) \leq 0.39$ are substantially satisfied. Thus, the damper device 10 may be structured so as to satisfy $\gamma_1 < \gamma_2$, $0.07 \leq \gamma_1 = T_{11}/(T_{11}+T_{21}) \leq 0.28$, and $0.12 \leq \gamma_2 = T_{12}/(T_{12}+T_{22}) \leq 0.42$, and more preferably to satisfy $\gamma_1 < \gamma_2$, $0.1 \leq \gamma_1 = T_{11}/(T_{11}+T_{21}) \leq 0.25$, and $0.1 \leq \gamma_2 = T_{12}/(T_{12}+T_{22}) \leq 0.39$.

When torque transmitted by the intermediate springs SPm between the first and second intermediate members 12 and 14 is "$T_m$", $\gamma_2 - \gamma_1 = T_m/(T_{11}+T_{21}) = T_m/(T_{12}+T_{22})$ holds. This value ($\gamma_2 - \gamma_1$) represents the ratio of torque transmitted by the intermediate springs SPm to the input torque T (torque output from the driven member 16), and the analysis conducted by the inventors has revealed that satisfying $0 < \gamma_2 - \gamma_1 \leq 0.35$ makes it possible to satisfactorily secure the vibration damping performance while preventing the damper device 10 from increasing in size. Herein, because it could even be said that the relation of $T_{11}+T_{21} = T_{12}+T_{22}$ does not strictly hold, the damper device 10 may be structured so as to satisfy either one of $0 < \gamma_2 - \gamma_1 \leq 0.35$ and $0 < T_m/(T_{12}+T_{22}) \leq 0.35$.

Figure 16:
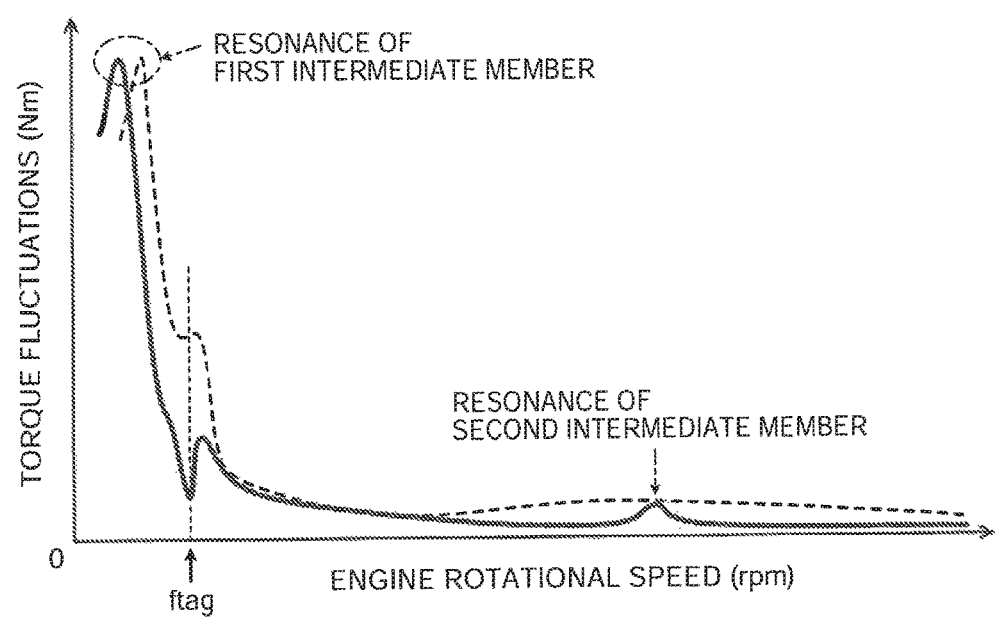
FIG. 16 is an explanatory graph illustrating a relation between the rotational speed of the engine and torque fluctuations in the output element of the damper device in consideration of hysteresis.

FIG. 16 is an explanatory graph illustrating a relation between the rotational speed of the engine EG and respective vibration amplitudes (torque fluctuations) in the driven members of the damper device 10 and the damper device of the comparative example in which the intermediate springs SPm are omitted, in consideration of hysteresis. In FIG. 16, the solid line represents a simulation result in which hysteresis of vibration amplitude (torque fluctuations) in the driven member of the damper device 10 is considered, and the dashed line represents a simulation result in which hysteresis of vibration amplitude (torque fluctuations) in the driven member of the damper device of the comparative example is considered. The model of the damper device 10 used for the simulation was constructed by determining various specifications such that the relation of $k_{11} < k_m < k_{12} < k_{22} < k_{21}$ and the relations of $\gamma_1 < \gamma_2$, $0.07 \leq \gamma_1 = T_{11}/(T_1+T_{21}) \leq 0.28$, and $0.12 \leq \gamma_2 = T_{12}/(T_{12}+T_{22}) \leq 0.42$ are satisfied, and that the frequency fa at the theoretical antiresonance point A substantially matches the frequency flag of resonance due to vibrations of the entire damper device 10 and the drive shaft of the vehicle. The model of the damper device of the comparative example used for the simulation was constructed by determining various specifications such that the frequency fa' at the theoretical antiresonance point substantially matches the frequency flag (the same value as in the case of the damper device 10) of resonance due to vibrations of the entire damper device and the drive shaft of the vehicle.

As depicted in FIG. 16, in the damper device 10, as compared to the damper device of the comparative example, resonance at the natural frequency $f_{21}$ on the low frequency side that generates the antiresonance point A, i.e., resonance of the first intermediate member 12, can be shifted toward a lower frequency side to be separated apart from the antiresonance point A. Thus, it can be understood that, in the damper device 10, the vibration damping performance can be significantly improved in comparison with the damper device of the comparative example by bringing the frequency fa at the antiresonance point A closer to the frequency flag of vibrations (resonance) to be damped. Consequently, in the starting device 1 including the damper device 10, as compared to the damper device of the comparative example, the lockup rotational speed Nlup of the lockup clutch 8 can be set on a lower rotational-speed side (e.g., a rotational speed lower than the rotational speed of the engine EG corresponding to the frequency flag). In other words, by selecting the spring constants $k_{11}$, $k_{12}$, $k_{21}$, $k_{22}$, and $k_m$ so as to satisfy $k_{11} < k_m < k_{12} < k_{22} < k_{21}$, torque can be suitably transmitted from the second intermediate member 14 to the first intermediate member 12 via the intermediate springs SPm, whereby the vibration damping performance of the damper device 10 can be significantly improved.

In the damper device 10, although the spring constant $k_{21}$ of the first inner springs SP21 is larger than the spring constant $k_{22}$ of the second inner springs SP22 ($k_{22} < k_{21}$), the relation between these springs is not limited to this. Specifically, in order to simplify the design of the damper device 10, specifications of the first inner springs SP21 including the spring constant $k_{21}$, the coil diameter, and the axial length may be set to the same as specifications of the second inner springs SP22 ($k_{22} = k_{21}$) including the spring constant $k_{22}$, the coil diameter, and the axial length. In the damper device 10, the spring constants $k_{11}$, $k_{12}$, $k_{21}$, and $k_{22}$ of the first and second outer springs SP11 and SP12 and the first and second inner springs SP21 and SP22 may be selected so as to satisfy the relations of $k_{21} < k_{11}$ and $k_{11}/k_{21} \neq k_{12}/k_{22}$, more specifically, the relation of $k_{21} < k_{22} < k_{12} \leq k_{11}$. In other words, the intermediate springs SPm may transmit, to the second intermediate member 14, part of torque (part of the average torque) transmitted from the drive member 11 to the first intermediate member 12 via the first outer springs SP11. In this case, the damper device 10 may be structured such that the moment of inertia $J_{22}$ of the second intermediate member 14 is larger than the moment of inertia $J_{21}$ of the first intermediate member 12, and the second intermediate member 14 may be coupled to the turbine runner 5 so as to rotate integrally therewith.

Furthermore, in the damper device 10, the spring constant $k_m$ of the intermediate springs SPm may be set to a value smaller than the spring constants $k_{11}$, $k_{12}$, $k_{21}$, and $k_{22}$ of the first and second outer springs SP11 and SP12 and the first and second inner springs SP21 and SP22. In other words, as described above, the natural frequency $f_{21}$ on the low rotational-speed side (low frequency side) and the frequency fa at the antiresonance point A decrease as the combined spring constant $k_5$ of the intermediate springs SPm decreases (see FIG. 12). Thus, reducing the spring constant (stiffness) $k_m$ of the intermediate springs SPm so that the spring constant $k_m$ is smaller than the spring constants $k_{11}$, $k_{12}$, $k_{21}$, and $k_{22}$ can further reduce the natural frequency $f_{21}$ and the frequency fa. Even if such a structure is used, the starting point of a rotational-speed band in which one of a set of vibrations transmitted from the second outer springs SP12 to the driven member 16 and a set of vibrations transmitted from the second inner springs SP22 to the driven member 16 cancels part of the other set of vibrations can be set on the lower rotational-speed side. In addition, by setting this starting point of the rotational-speed band on the lower rotational-speed side, the rotational speed (frequency) at which the phase of vibrations transmitted from the second outer springs SP12 to the driven member 16 and the phase of vibrations transmitted from the second inner springs SP22 to the driven member 16 are shifted 180° from each other can also be set on the lower rotational-speed side (lower frequency side). In this case, the spring constants $k_{11}$, $k_{12}$, $k_{21}$, and $k_{22}$ of the first and second outer springs SP11 and SP12 and the first and second inner springs SP21 and SP22 may satisfy at least the relations of $k_{11} \neq k_{21}$ and $k_{11}/k_{21} \neq k_{12}/k_{22}$. In this case, the spring constants $k_{11}$, $k_{12}$, $k_{21}$ and $k_{22}$ may satisfy the relation of $k_{11}/k_{21} < k_{12}/k_{22}$ or $k_{12}/k_{22} < k_{11}/k_{21}$, or may satisfy the relation of $k_{11} < k_{12} < k_{22} \leq k_{21}$ or $k_{21} < k_{22} < k_{12} \leq k_{11}$.

In the damper device 10, the spring constant $k_m$ of the intermediate springs SPm may be set larger than the spring constants $k_{11}$, $k_{12}$, $k_{21}$, and $k_{22}$ of the first and second outer springs SP11 and SP12 and the first and second inner springs SP21 and SP22. In other words, as described above, the difference (fa–$f_{21}$) between the natural frequency $f_{21}$ on the low rotational-speed side (low frequency side) and the frequency fa at the antiresonance point A increases as the combined spring constant $k_5$ of the intermediate springs SPm increases (see FIG. 12). Thus, setting the spring constant (stiffness) $k_m$ of the intermediate springs SPm to be larger than the spring constants $k_{11}$, $k_{12}$, $k_{21}$, and $k_{22}$ can increase the difference (fa–$f_{21}$) between the natural frequency $f_{21}$ and the frequency fa. This makes it possible to widen the rotational-speed band in which one of a set of vibrations transmitted from the second outer springs SP12 to the driven member 16 and a set of vibrations transmitted from the second inner springs SP22 to the driven member 16 cancels at least part of the other set of vibrations, that is, a range in which the vibration level of the driven member 16 can be satisfactorily reduced.

In this case, the spring constants $k_{11}$, $k_{12}$, $k_{21}$, and $k_{22}$ of the first and second outer springs SP11 and SP12 and the first and second inner springs SP21 and SP22 may be adjusted so that the natural frequency $f_{21}$ and the frequency fa at the antiresonance point A become smaller and the difference (fa–$f_{21}$) between both frequencies becomes larger. Such a structure is advantageous when being used for a damper device in which the maximum input torque to the drive member 11 is relatively small and the required equivalent stiffness $k_{eq}$ is relatively low, in terms of ease in setting numerical values of the spring constants $k_1$, $k_{12}$, $k_{21}$, and $k_{22}$ to reduce the natural frequency $f_{21}$ and the frequency fa at the antiresonance point A. In this case also, the spring constants $k_{11}$, $k_{12}$, $k_{21}$, and $k_{22}$ of the first and second outer springs SP11 and SP12 and the first and second inner springs SP21 and SP22 may satisfy at least the relations of $k_{11} \neq k_{21}$ and $k_{11}/k_{21} \neq k_{12}/k_{22}$. In this case also, the spring constants $k_{11}$, $k_{12}$, $k_{21}$, and $k_{22}$ may satisfy the relation of $k_1/k_{21} < k_{12}/k_{22}$ or $k_{12}/k_{22} < k_1/k_{21}$, or may satisfy the relation of $k_{11} < k_{12} < k_{22} \leq k_{21}$ or $k_{21} < k_{22} < k_{12} \leq k_{11}$.

Furthermore, in the damper device 10, the intermediate springs SPm may be arranged so as to be aligned with the first and second inner springs SP21 and SP22 along the circumferential direction. The damper device 10 may further include at least one torque transfer path that is provided parallel to the first and second torque transfer paths P1 and P2, for example, in addition to the first, second, and third torque transfer paths P1, P2, and P3. Furthermore, at least either one of the first and second torque transfer paths P1 and P2, for example, of the damper device 10 may be additionally provided with at least one set of an intermediate member and a spring (elastic body).

In the starting device 1, when slip control for matching the actual slip speed (actual rotational speed difference) between the engine EG and the input shaft (drive member 11) of the transmission TM to the target slip speed is performed, the frequency fa at the antiresonance point A may be matched to the frequency fs of a shudder that occurs when the slip control is performed, or may be set to a value near the frequency fs of the shudder. This enables further reduction in shudder occurring when the slip control is performed. When the moment of inertia of the lockup piston 80 and the drive member 11 that rotate integrally is "$J_{pd}$", the frequency fs of the shudder can be expressed as $fs = 1/2\pi\sqrt{(k_{eq}/J_{pd})}$ by using the moment of inertia $J_{pd}$ and the equivalent stiffness $k_{eq}$ of the damper device 10.

As described in the foregoing, the damper device of the present disclosure is a damper device (10) having an input element (11) to which torque from an engine (EG) is transmitted and an output element (16). The damper device (10) includes: a first intermediate element (12); a second intermediate element (14); a first elastic body (SP11) that transmits torque between the input element (11) and the first intermediate element (12); a second elastic body (SP12) that transmits torque between the first intermediate element (12) and the output element (16); a third elastic body (SP21) that transmits torque between the input element (11) and the second intermediate element (14); a fourth elastic body (SP22) that transmits torque between the second intermediate element (14) and the output element (16); and a fifth elastic body (SPm) that transmits torque between the first intermediate element (12) and the second intermediate element (14).

In the damper device of the present disclosure, under conditions in which all the first to fifth elastic bodies are allowed to deform, two natural frequencies can be set in the entire device. Research and analyses conducted by the inventors have revealed that the natural frequency of the damper device including the first to fifth elastic bodies decreases as the stiffness of the fifth elastic body decreases, and that a change in equivalent stiffness of the damper device with respect to a change in stiffness of the fifth elastic body is significantly smaller than changes in the equivalent stiffness with respect to changes in stiffnesses of the first to fourth elastic bodies. Thus, in the damper device of the present disclosure, by adjusting the stiffness of the fifth elastic body, it is possible to suitably set two natural frequencies of the entire device while suitably maintaining the equivalent stiffness of the damper device and preventing the weights (moments of inertia) of the first and second intermediate elements from increasing. Consequently, in the damper device of the present disclosure, the vibration damping performance can be satisfactorily improved.

More specifically, in the damper device of the present disclosure, between the input element and the output element, the first intermediate element and the first and second elastic bodies form a first torque transfer path, and also the second intermediate element and the third and fourth elastic bodies form a second torque transfer path. The damper device of the present disclosure includes the fifth elastic body in addition to the first to fourth elastic bodies, and this fifth elastic body transmits torque between the first intermediate element and the second intermediate element. In this damper device, under conditions in which all the first to fifth elastic bodies are allowed to deform, two natural frequencies can be set in the entire device. When two natural frequencies are set in the entire device as described above, once resonance has occurred at a lower natural frequency of the two natural frequencies depending on the frequency of vibrations transmitted to the input element, the phase of vibrations transmitted from the second elastic body to the output element and the phase of vibrations transmitted from the fourth elastic body to the output element shift apart. Accordingly, as the rotational speed of the input element increases after the resonance has occurred at the lower natural frequency of the two natural frequencies, one of a set of vibrations transmitted from the second elastic body to the output element and a set of vibrations transmitted from the fourth elastic body to the output element cancels at least part of the other set of vibrations of the set of the vibrations transmitted from the second elastic body to the output element and the set of the vibrations transmitted from the fourth elastic body to the output element. The phase of the vibrations transmitted from the second elastic body to the output element and the phase of the vibrations transmitted from the fourth elastic body to the output element are shifted 180° from each other, whereby both sets of vibrations are mutually canceled, so that an antiresonance point where the vibration amplitude of the output element theoretically becomes zero can be set.

Furthermore, research and analyses conducted by the inventors have revealed that the natural frequency on the low rotational-speed side (low frequency side) and the frequency at the antiresonance point decrease as the stiffness of the fifth elastic body decreases, and that the difference between the natural frequency on the low rotational-speed side and the frequency at the antiresonance point increases as the stiffness of the fifth elastic body increases. Thus, in the damper device of the present disclosure, by adjusting the stiffness of the fifth elastic body, it is possible to suitably set the natural frequency on the low rotational-speed side and the frequency at the antiresonance point while suitably maintaining the equivalent stiffness in accordance with the maximum input torque to the input element and preventing the weights (moments of inertia) of the first and second intermediate elements from increasing. In other words, by adjusting the stiffness of the fifth elastic body to reduce the natural frequency on the low rotational-speed side and the frequency at the antiresonance point, the starting point of a rotational-speed band (frequency band) in which one of a set of vibrations transmitted from the second elastic body to the output element and a set of vibrations transmitted from the fourth elastic body to the output element cancels at least part of the other set of vibrations can be set on the lower rotational-speed side. Accordingly, the rotational speed (frequency) at which the phase of the vibrations transmitted from the second elastic body to the output element and the phase of the vibrations transmitted from the fourth elastic body to the output element are shifted 180° from each other can be set on the lower rotational-speed side. By adjusting the stiffness of the fifth elastic body to increase the difference between the natural frequency on the low rotational-speed side and the frequency at the antiresonance point, the rotational-speed band in which one of the set of the vibrations transmitted from the second elastic body to the output element and the set of the vibrations transmitted from the fourth elastic body to the output element cancels at least part of the other set of vibrations can be widened. Consequently, in the damper device of the present disclosure, the vibration damping performance can be satisfactorily improved by bringing the frequency at the antiresonance point closer to the frequency of vibrations (resonance) to be damped by the damper device.

The natural frequency ($f_{21}$) of the first intermediate element (12) when torque is transmitted from the input element (11) to the output element (16) via all the first to fifth elastic bodies (SP11, SP12, SP21, SP22, SPm) may be different from the natural frequency ($f_{22}$) of the second intermediate element (14) when torque is transmitted from the input element (11) to the output element (16) via all the first to fifth elastic bodies (SP11, SP12, SP21, SP22, SPm). In other words, the damper device of the present disclosure may be structured such that, after resonance has occurred at the lower natural frequency of the natural frequencies of the first and second intermediate elements, one of a set of vibrations transmitted from the second elastic body to the output element and a set of vibrations transmitted from the fourth elastic body to the output element cancels at least part of the other set of vibrations. In addition, in the damper device of the present disclosure, because the first intermediate element and the second intermediate element are coupled to each other via the fifth elastic body, vibrations of the first intermediate element and the vibrations of the second intermediate element are coupled (both sets of vibrations affect each other). Accordingly, the natural frequencies of the first and second intermediate elements are each affected by both of the moments of inertia of the first and second intermediate elements, and thus it is possible to easily shift the resonance at the lower natural frequency of the natural frequencies of the first and second intermediate elements toward the lower rotational-speed side while preventing the weights (moments of inertia) of the first and second intermediate elements from increasing. Herein, the resonance at the lower natural frequency of the natural frequencies of the first and second intermediate elements may be a hypothetical one that does not occur within a rotational-speed range in which the damper device is used.

As described above, when torque is transmitted from the input element (11) to the output element (16) via all the first to fifth elastic bodies (SP11, SP12, SP21, SP22, SPm), one of a set of vibrations transmitted from the second elastic body (SP12) to the output element (16) and a set of vibrations transmitted from the fourth elastic body (SP22) to the output element (16) may cancel at least part of the other set of vibrations.

Furthermore, the fifth elastic body (SPm) may transmit, to the first intermediate element (12) or the second intermediate element (11), part of torque transmitted from the input element (11) to the second intermediate element (14) via the third elastic body (SP21) or part of torque transmitted from the input element (11) to the first intermediate element (12) via the first elastic body (SP11). This can reduce the torque sharing of the first or third elastic body, thereby reducing the stiffness of the first or third elastic body. Thus, friction force generated between the first or third elastic body and rotating elements, i.e., hysteresis, can be reduced, and the phase reversal of vibrations transmitted from the second or fourth elastic body to the output element due to the resonance at the lower natural frequency of the two natural frequencies can be quickly completed. Consequently, the shift, toward the high frequency side due to hysteresis, of the frequency at which the phase of vibrations transmitted from the second elastic body to the output element and the phase of vibrations transmitted from the fourth elastic body to the output element are shifted 180° from each other can be reduced, whereby the vibration damping performance of the damper device can be satisfactorily improved.

When the stiffness of the first elastic body (SP11) is "$k_{11}$", the stiffness of the second elastic body (SP12) is "$k_{12}$", the stiffness of the third elastic body (SP21) is "$k_{21}$", and the stiffness of the fourth elastic body (SP22) is "$k_{22}$", the stiffnesses $k_{11}$, $k_{12}$, $k_{21}$, and $k_{22}$ of the first to fourth elastic bodies may be selected so as to satisfy $k_{11}$ $k_{21}$ and $k_{11}/k_{21} \neq k_{12}/k_{22}$. This enables torque to be transmitted between the input element and the output element through, in addition to the first and second torque transfer paths, a third torque transfer path including the first elastic body, the first intermediate element, the fifth elastic body, the second intermediate element, and the fourth elastic body, or the third elastic body, the second intermediate element, the fifth elastic body, the first intermediate element, and the second elastic body, when all the first to fifth elastic bodies are allowed to deform.

Furthermore, the stiffnesses $k_{11}$, $k_{12}$, $k_{21}$, and $k_{22}$ of the first to fourth elastic bodies (SP11, SP12, SP21, SP22) may be selected so as to satisfy $k_{11}/k_{21}<k_{12}/k_{22}$ This enables torque to be transmitted between the input element and the output element through, in addition to the first and second torque transfer paths, the third torque transfer path including the third elastic body, the second intermediate element, the fifth elastic body, the first intermediate element, and the third elastic body.

The stiffnesses $k_{11}$, $k_{12}$, $k_{21}$, and $k_{22}$ of the first to fourth elastic bodies (SP11, SP12, SP21, SP22) may be selected so as to satisfy $k_{11}<k_{12}<k_{22} \leq k_{21}$. In the damper device structured in this manner, when all the first to fifth elastic bodies are allowed to deform, torque is transmitted between the input element and the output element through, in addition to the first and second torque transfer paths, the third torque transfer path including the third elastic body, the second intermediate element, the fifth elastic body, the first intermediate element, and the second elastic body. By selecting the stiffnesses $k_{11}$, $k_{12}$, $k_{21}$, and $k_{22}$ so as to satisfy $k_{11}<k_{12}<k_{22} \leq k_{21}$, the stiffness $k_{11}$ of the first elastic body can be reduced and, furthermore, the stiffness $k_{12}$ of the second elastic body can also be reduced. Accordingly, friction force generated between the first and second elastic bodies and the rotating elements, i.e., hysteresis, can be reduced, and also resonance (resonance of the first intermediate element) at the lower natural frequency of the two natural frequencies can be shifted toward a lower frequency side. Consequently, the shift, toward the high frequency side due to hysteresis, of the frequency at which the phase of vibrations transmitted from the second elastic body to the output element shifts 180° with respect to the phase of vibrations transmitted from the fourth elastic body to the output element can be more satisfactorily reduced. Alternatively, the stiffnesses $k_{11}$, $k_{12}$, $k_{21}$ and $k_{22}$ of the first to fourth elastic bodies may be selected so as to satisfy $k_{21}<k_{11}$ and $k_{11}/k_{21} \neq k_{12}/k_{22}$, more specifically, $k_{21}<k_{22}<k_{12} \leq k_{11}$. In other words, the relation of both $k_{11} \neq k_{21}$, and $k_{11}/k_{21} \neq k_{12}/k_{22}$ is based on both of the relation of $k_{11}<k_{12}<k_{22} \leq k_{21}$ and the relation of $k_{21}<k_{22}<k_{12} \leq k_{11}$.

Furthermore, when the stiffness of the fifth elastic body (SPm) is "$k_m$", the stiffnesses $k_{11}$, $k_{12}$, $k_{21}$, $k_{22}$ and $k_m$ of the first to fifth elastic bodies may be selected so as to satisfy $k_{11}<k_m<k_{12}<k_{22} \leq k_{21}$. This enables torque to be suitably transmitted from the second intermediate element to the first intermediate element via the fifth elastic body, whereby the vibration damping performance of the damper device can be significantly improved.

The stiffness ($k_m$) of the fifth elastic body (SPm) may be higher than the stiffnesses $k_{11}$, $k_{12}$, $k_{21}$, and $k_{22}$ Of the first to fourth elastic bodies (SP11, SP12, SP21, SP22). In other words, the difference between the natural frequency on the low rotational-speed side and the frequency at the antiresonance point increases as the stiffness of the fifth elastic body increases as described above. Thus, setting the stiffness of the fifth elastic body to be higher than the stiffnesses of the first to fourth elastic bodies can increase the difference between the natural frequency on the low rotational-speed side and the frequency at the antiresonance point. This makes it possible to widen the rotational-speed band in which one of a set of vibrations transmitted from the second elastic body to the output element and a set of vibrations transmitted from the fourth elastic body to the output element cancels at least part of the other set of vibrations, that is, a range in which the vibration level of the output element can be satisfactorily reduced.

Furthermore, the stiffness ($k_m$) of the fifth elastic body (SPm) may be lower than the stiffnesses $k_{11}$, $k_{12}$, $k_{21}$, and $k_{22}$ of the first to fourth elastic bodies (SP11, SP12, SP21, SP22). In other words, the natural frequency on the low rotational-speed side (low frequency side) and the frequency at the antiresonance point decrease as the stiffness of the fifth elastic body decreases as described above. Thus, setting the stiffness of the fifth elastic body to be lower than the stiffnesses of the first to fourth elastic bodies enables the natural frequency on the low rotational-speed side and the frequency at the antiresonance point to become lower. Accordingly, the starting point of the rotational-speed band (frequency band) in which one of a set of vibrations transmitted from the second elastic body to the output element and a set of vibrations transmitted from the fourth elastic body to the output element cancels at least part of the other set of vibrations can be set on the lower rotational-speed side, so that the rotational speed (frequency) at which the phases of both sets of vibrations are shifted 180° from each other can be set on the lower rotational-speed side.

The moment of inertia of the first intermediate element (12) may be larger than the moment of inertia of the second intermediate element (14). This enables the lower natural frequency of two natural frequencies of the damper device to become lower, so that the vibration level near the antiresonance point can be further reduced.

Furthermore, the first intermediate element (12) may be coupled to a turbine runner (5) that constitutes a fluid transmission apparatus along with a pump impeller (4) so as to rotate together therewith. This can increase the substantial moment of inertia (sum of the moments of inertia) of the first intermediate element, and thus the lower natural frequency of the two natural frequencies of the damper device can be further reduced.

The damper device (10) may be structured such that, when torque transmitted by the first elastic body (SP11) is "$T_{11}$", torque transmitted by the second elastic body (SP12) is "$T_{12}$", torque transmitted by the third elastic body (SP21) is "$T_{21}$", and torque transmitted by the fourth elastic body (SP22) is "$T_{22}$", $T_{11}/(T_{11}+T_{21})<T_{12}/(T_{12}+T_{22})$, $0.07 \le T_{11}/(T_{11}+T_{21}) \le 0.28$, and $0.12 \le T_{12}/(T_{12}+T_{22}) \le 0.42$ are satisfied. This makes it possible to satisfactorily secure the vibration damping performance while preventing the damper device from increasing in size.

Furthermore, the damper device (10) may be structured such that, when torque transmitted by the fifth elastic body (SPm) is "$T_m$", at least either one of $0<T_m/(T_{11}+T_{21}) \le 0.35$ and $0<T_m/(T_{12}+T_{22}) \le 0.35$ is satisfied.

The spring constants (combined spring constant) $k_1$, $k_2$, $k_3$, $k_4$, and $k_5$ of the first, second, third, fourth, and fifth elastic bodies (SP11, SP12, SP21, SP22, SPm) and the moments of inertia ($J_{21}$, $J_{22}$) of the first and second intermediate elements (12, 14) may be determined based on the frequency at the antiresonance point where the vibration amplitude of the output element (16) becomes zero. This makes it possible to excellently damp vibrations transmitted to the input element.

Furthermore, the spring constants (combined spring constant) $k_1$, $k_2$, $k_3$, $k_4$, and $k_5$ of the first, second, third, fourth, and fifth elastic bodies (SP11, SP12, SP21, SP22, SPm) and the moments of inertia ($J_{21}$, $J_{22}$) of the first and second intermediate elements (12, 14) may be determined based on the frequency at the antiresonance point and the number of cylinders (n) of the engine (EG). This makes it possible to improve the vibration damping performance of the damper device in the low rotational-speed range in which vibrations from the engine tend to become large.

The damper device (10) may be structured such that, when the frequency at the antiresonance point where the vibration amplitude of the output element (16) becomes zero is "fa" and the number of cylinders of the engine (EG) is "n", 500 rpm$\le(120/n)\cdot$fa$\le$1500 rpm is satisfied. In this manner, by setting the antiresonance point at which the vibration amplitude of the output element can be further reduced within the low rotational-speed range of 500 rpm to 1500 rpm, coupling between the engine and the input element at a lower rotational speed can be allowed, and also the vibration damping performance of the damper device in the low rotational-speed range in which vibrations from the engine tend to become large can be further improved. By structuring the damper device so that the frequency of resonance that generates the antiresonance point (resonance that has to be generated so as to form the antiresonance point) is a value that is lower than the frequency at the antiresonance point and is as low as possible, the frequency at the antiresonance point can be further reduced, and coupling between the engine and the input element can be allowed at a further lower rotational speed. By structuring the damper device so that the frequency of resonance that occurs on the higher rotational-speed side (higher frequency side) of the antiresonance point becomes higher, the resonance can be caused to occur on the high rotational-speed range side on which vibrations are less likely to become apparent, whereby the vibration damping performance of the damper device in the low rotational-speed range can be further improved.

Furthermore, the damper device (10) may be structured such that, when the lockup rotational speed of a lockup clutch (8) that couples the engine (EG) to the input element (11) is "Nlup", Nlup$\le(120/n)\cdot$fa is satisfied. This enables the damper device to excellently damp vibrations from the engine when the lockup clutch couples the engine to the input element and immediately after starting the coupling.

The damper device (10) may be structured so as to satisfy 900 rpm$\le(120/n)\cdot$fa$\le$1200 rpm.

Furthermore, the frequency fa at the antiresonance point may be represented by Formula (6) above.

The damper device (10) may be structured such that deformation of the first to fifth elastic bodies (SP11, SP12, SP21, SP22, SPm) is not restricted until input torque (T) transmitted to the input element becomes equal to or greater than a predetermined threshold (T1). This makes it possible to satisfactorily improve the vibration damping performance of the damper device when the input torque transmitted to the input element is relatively small and the rotational speed of the input element is low.

Furthermore, the damper device (10) may further include a first stopper (21) that restricts relative rotation between the first intermediate element (12) and the output element (16); a second stopper (22) that restricts relative rotation between the second intermediate element (14) and the output element (16); and a third stopper (23) that restricts relative rotation between the input element (11) and the output element (16). The first and second stoppers (21, 22) may restrict relative rotation between the first or second intermediate element (12, 14) and the output element (16) when the input torque (T) reaches the threshold (T1), and the third stopper (23) may restrict relative rotation between the input element (11) and the output element (16) when the input torque (T) reaches a second threshold (T2) that is higher than the threshold (T1). This enables the damper device to have damping characteristics in two stages.

The first, second, third, and fourth elastic bodies (SP11, SP12, SP21, SP22) may be coil springs, and the coil springs may be straight coil springs or may be arcuate coil springs.

Furthermore, the fifth elastic body (SPm) may be a coil spring, and the coil spring may be a straight coil spring or may be an arcuate coil spring.

The input element (11) may have a contact portion (111c) being in contact with an end of the first elastic body (SP11) and contact portions (112c, 113c) being in contact with an end of the third elastic body (SP21). The output element (16) may have a contact portion (16co) being in contact with an end of the second elastic body (SP12) and a contact portion (16ci) being in contact with an end of the fourth elastic body (SP22). The first intermediate element (12) may have contact portions (121c, 122c) being in contact with an end of the first elastic body, contact portions (121c, 122c) being in contact with an end of the second elastic body (SP12), and contact portions (122d) being in contact with ends of the fifth elastic body (SPm). The second intermediate element (14) may have a contact portion (14c) being in contact with an end of the third elastic body (SP21), a contact portion (14c) being in contact with an end of the fourth elastic body, and contact portions (14d) being in contact with the ends of the fifth elastic body (SPm).

Furthermore, the output element (16) is operatively (directly or indirectly) coupled to an input shaft (IS) of a transmission (TM), and the input element (11) may be operatively (directly or indirectly) coupled to an output shaft of an internal combustion engine.

To the input element (11), torque from the engine (EG) may be transmitted via the lockup clutch (8). The lockup rotational speed (Nlup) of the lockup clutch (8) may be higher than a rotational speed corresponding to a lower natural frequency of the natural frequencies ($f_{21}$, $f_{22}$) of the first and second intermediate elements (12, 14) when torque is transmitted from the input element (11) to the output element (16) via all the first to fifth elastic bodies (SP11, SP12, SP21, SP22, SPm), and may be lower than a rotational speed corresponding to the higher natural frequency of the natural frequencies. In this manner, by causing the rotational speed corresponding to the lower natural frequency of the natural frequencies of the first and second intermediate elements to be included in the non-lockup region of the lockup clutch, from the time when lockup is performed by the lockup clutch, one of a set of vibrations transmitted from the second elastic body to the output element and a set of vibrations transmitted from the fourth elastic body to the output element can cancel at least part of the other set of vibrations.

Furthermore, the first and second elastic bodies (SP11, SP12) may be disposed so as to be aligned along the circumferential direction of the damper device (10), and the third and fourth elastic bodies (SP21, SP22) may be disposed radially inward of the first and second elastic bodies (SP11, SP12) so as to be aligned along the circumferential direction. This makes it possible to reduce the stiffnesses of the first elastic body and the second elastic body on the outer peripheral side while further shortening the axial length of the damper device, so that hysteresis of the first and second elastic bodies can be reduced, and also centrifugal force that acts on the third and fourth elastic bodies on the inner peripheral side can be reduced to reduce hysteresis of the third and fourth elastic bodies. Thus, in the damper device, hysteresis of the entire device can be satisfactorily reduced. The fifth elastic body (SPm) may be disposed so as to be aligned with the first and second elastic bodies (SP11, SP12) along the circumferential direction. This enables strokes of the first, second, and fifth elastic bodies to be suitably secured.

The disclosure of the present disclosure is not limited to the embodiment described above and, needless to say, various changes may be made within the scope of the present disclosure. Furthermore, the embodiment described above is merely one specific mode of the disclosure described only in the "SUMMARY" section, and does not limit the elements of the disclosure described in the "SUMMARY" section.

INDUSTRIAL APPLICABILITY

The disclosure of the present disclosure is applicable to the manufacturing field, for example, of damper devices.

The invention claimed is:

1. A damper device comprising:
   an input element to which torque from an engine is transmitted;
   an output element;
   a first intermediate element;
   a second intermediate element;
   a first elastic body that transmits torque between the input element and the first intermediate element;
   a second elastic body that transmits torque between the first intermediate element and the output element;
   a third elastic body that transmits torque between the input element and the second intermediate element;
   a fourth elastic body that transmits torque between the second intermediate element and the output element; and
   a fifth elastic body that transmits torque between the first intermediate element and the second intermediate element.

2. The damper device according to claim 1, wherein
   a natural frequency of the first intermediate element when torque is transmitted from the input element to the output element via all the first to fifth elastic bodies is different from a natural frequency of the second intermediate element when torque is transmitted from the input element to the output element via all the first to fifth elastic bodies.

3. The damper device according to claim 2, wherein
   when torque is transmitted from the input element to the output element via all the first to fifth elastic bodies, one of a set of vibrations transmitted from the second elastic body to the output element and a set of vibrations transmitted from the fourth elastic body to the output element cancels at least part of the other set of vibrations of the set of vibrations transmitted from the second elastic body to the output element and the set of vibrations transmitted from the fourth elastic body to the output element.

4. The damper device according to claim 2, wherein
   the fifth elastic body transmits, to the first intermediate element or the second intermediate element, part of torque transmitted from the input element to the second intermediate element via the third elastic body or part of torque transmitted from the input element to the first intermediate element via the first elastic body.

5. The damper device according to claim 1, wherein
   when torque is transmitted from the input element to the output element via all the first to fifth elastic bodies, one of a set of vibrations transmitted from the second elastic body to the output element and a set of vibrations transmitted from the fourth elastic body to the output element cancels at least part of the other set of vibrations of the set of vibrations transmitted from the second elastic body to the output element and the set of vibrations transmitted from the fourth elastic body to the output element.

6. The damper device according to claim 1, wherein
   the fifth elastic body transmits, to the first intermediate element or the second intermediate element, part of torque transmitted from the input element to the second intermediate element via the third elastic body or part of torque transmitted from the input element to the first intermediate element via the first elastic body.

7. The damper device according to claim 6, wherein deformation of the first to fifth elastic bodies is not restricted until input torque transmitted to the input element becomes equal to or greater than a predetermined threshold.

8. The damper device according to claim 1, wherein when stiffness of the first elastic body is "$k_{11}$", stiffness of the second elastic body is "$k_{12}$", stiffness of the third elastic body is "$k_{21}$", and stiffness of the fourth elastic body is "$k_{22}$", the stiffnesses $k_{11}$, $k_{12}$, $k_{21}$, and $k_{22}$ of the first to fourth elastic bodies are selected so as to satisfy $k_{11} \neq k_{21}$ and $k_{11}/k_{21} \neq k_{12}/k_{22}$.

9. The damper device according to claim 8, wherein the stiffnesses $k_{11}$, $k_{12}$, $k_{21}$, and $k_{22}$ of the first to fourth elastic bodies are selected so as to satisfy $k_{11}/k_{21} < k_{12}/k_{22}$.

10. The damper device according to claim 8, wherein the stiffnesses $k_{11}$, $k_{12}$, $k_{21}$, and $k_{22}$ of the first to fourth elastic bodies are selected so as to satisfy $k_{11} < k_{12} < k_{22} \leq k_{21}$.

11. The damper device according to claim 8, wherein when stiffness of the fifth elastic body is "$k_m$", the stiffnesses $k_{11}$, $k_{12}$, $k_{21}$, $k_{22}$, and $k_m$ of the first to fifth elastic bodies are selected so as to satisfy $k_{11} < k_m < k_{12} < k_{22} \leq k_{21}$.

12. The damper device according to claim 8, wherein a stiffness of the fifth elastic body is higher than the stiffnesses $k_{11}$, $k_{12}$, $k_{21}$, and $k_{22}$ of the first to fourth elastic bodies.

13. The damper device according to claim 8, wherein a stiffness of the fifth elastic body is lower than the stiffnesses $k_{11}$, $k_{12}$, $k_{21}$, and $k_{22}$ of the first to fourth elastic bodies.

14. The damper device according to claim 1, wherein moment of inertia of the first intermediate element is larger than moment of inertia of the second intermediate element.

15. The damper device according to claim 1, wherein the first intermediate element is coupled to a turbine runner that forms a fluid transmission apparatus along with a pump impeller so as to rotate together therewith.

16. The damper device according to claim 1, wherein when torque transmitted by the first elastic body is "$T_{11}$", torque transmitted by the second elastic body is "$T_{12}$", torque transmitted by the third elastic body is "$T_{21}$", and torque transmitted by the fourth elastic body is "$T_{22}$", $T_{11}/(T_{11}+T_{21}) < T_{12}/(T_{12}+T_{22})$, $0.07 \leq T_{11}/(T_{11}+T_{21}) \leq 0.28$, and $0.12 \leq T_{12}/(T_{12}+T_{22}) \leq 0.42$ are satisfied.

17. The damper device according to claim 1, wherein when torque transmitted by the first elastic body is "$T_{11}$", torque transmitted by the second elastic body is "$T_{12}$", torque transmitted by the third elastic body is "$T_{21}$", and torque transmitted by the fourth elastic body is "$T_{22}$", and when torque transmitted by the fifth elastic body is "$T_m$", at least either one of $0 < T_m/(T_{11}+T_{21}) \leq 0.35$ and $0 < T_m/(T_{12}+T_{22}) \leq 0.35$ is satisfied.

18. The damper device according to claim 1, wherein based on frequency at an antiresonance point where vibration amplitude of the output element becomes zero, spring constants of the first, second, third, fourth, and fifth elastic bodies and moments of inertia of the first and second intermediate elements are determined.

19. The damper device according to claim 18, wherein based on the frequency at the antiresonance point and the number of cylinders of the engine, the spring constants of the first, second, third, fourth, and fifth elastic bodies and the moments of inertia of the first and second intermediate elements are determined.

20. The damper device according to claim 19, wherein when the frequency at the antiresonance point where vibration amplitude of the output element becomes zero is "fa" and the number of cylinders of the engine is "n", $500 \text{ rpm} \leq (120/n) \cdot fa \leq 1500 \text{ rpm}$ is satisfied.

21. The damper device according to claim 20, wherein $900 \text{ rpm} \leq (120/n) \cdot fa \leq 1200 \text{ rpm}$ is satisfied.

22. The damper device according to claim 20, wherein the frequency fa at the antiresonance point is represented by Formula (1):

$$fa = \frac{1}{2\pi}\sqrt{\frac{k_5 \cdot (k_1+k_3) \cdot (k_2+k_4) + k_1 k_2 k_3 + k_1 k_2 k_4 + k_1 k_3 k_4 + k_2 k_3 k_4}{J_{21} k_3 k_4 + J_{22} k_1 k_2}} \quad (1)$$

in Formula (1), "$k_1$" is a combined spring constant of the first elastic body, "$k_2$" is a combined spring constant of the second elastic body, "$k_3$" is a combined spring constant of the third elastic body, "$k_4$" is a combined spring constant of the fourth elastic body, "$k_5$" is a combined spring constant of the fifth elastic body, "$J_{21}$" is the moment of inertia of the first intermediate element, and "$J_{22}$" is the moment of inertia of the second intermediate element.

23. The damper device according to claim 19, wherein when the frequency at the antiresonance point where vibration amplitude of the output element becomes zero is "fa", the number of cylinders of the engine is "n", and lockup rotational speed of a lockup clutch that couples the engine and the input element is "Nlup", $Nlup \leq (120/n) \cdot fa$ is satisfied.

24. The damper device according to claim 1, wherein deformation of the first to fifth elastic bodies is not restricted until input torque transmitted to the input element becomes equal to or greater than a predetermined threshold.

25. The damper device according to claim 24, further comprising:
a first stopper that restricts relative rotation between the first intermediate element and the output element;
a second stopper that restricts relative rotation between the second intermediate element and the output element; and
a third stopper that restricts relative rotation between the input element and the output element, wherein
the first and second stoppers restrict relative rotation between the first or second intermediate element and the output element when the input torque reaches the threshold, and the third stopper restricts relative rotation between the input element and the output element when the input torque reaches a second threshold that is higher than the threshold.

26. The damper device according to claim 1, wherein
the input element has a contact portion being in contact with an end of the first elastic body and a contact portion being in contact with an end of the third elastic body,
the output element has a contact portion being in contact with an end of the second elastic body and a contact portion being in contact with an end of the fourth elastic body,
the first intermediate element has a contact portion being in contact with an end of the first elastic body, a contact portion being in contact with an end of the second elastic body, and a contact portion being in contact with an end of the fifth elastic body, and
the second intermediate element has a contact portion being in contact with an end of the third elastic body, a contact portion being in contact with an end of the fourth elastic body, and a contact portion being in contact with the end of the fifth elastic body.

27. The damper device according to claim 1, wherein the first, second, third, and fourth elastic bodies are coil springs.

28. The damper device according to claim 1, wherein the fifth elastic body is a coil spring.

29. The damper device according to claim 1, wherein the output element is operatively coupled to an input shaft of a transmission.

30. The damper device according to claim 29, wherein
to the input element, torque from the engine is transmitted via a lockup clutch, and
lockup rotational speed of the lockup clutch is higher than a rotational speed corresponding to a lower natural frequency of the natural frequencies of the first and second intermediate elements when torque is transmitted from the input element to the output element via all the first to fifth elastic bodies, and is lower than a rotational speed corresponding to the higher natural frequency of the natural frequencies of the first and second intermediate elements when torque is transmitted from the input element to the output element via all the first to fifth elastic bodies.

* * * * *